(12) United States Patent
Kurita et al.

(10) Patent No.: US 11,847,762 B2
(45) Date of Patent: Dec. 19, 2023

(54) INFORMATION PROCESSING APPARATUS AND METHOD FOR PROCESSING INFORMATION

(71) Applicant: SONY CORPORATION, Tokyo (JP)

(72) Inventors: Teppei Kurita, Tokyo (JP); Shun Kaizu, Tokyo (JP); Yasutaka Hirasawa, Tokyo (JP); Yuhi Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 472 days.

(21) Appl. No.: 17/048,762

(22) PCT Filed: Jan. 31, 2019

(86) PCT No.: PCT/JP2019/003391
§ 371 (c)(1),
(2) Date: Oct. 19, 2020

(87) PCT Pub. No.: WO2019/207886
PCT Pub. Date: Oct. 31, 2019

(65) Prior Publication Data
US 2021/0201450 A1 Jul. 1, 2021

(30) Foreign Application Priority Data

Apr. 26, 2018 (JP) ................................ 2018-084919

(51) Int. Cl.
*G06T 5/00* (2006.01)
*G06T 7/40* (2017.01)

(52) U.S. Cl.
CPC ................ *G06T 5/002* (2013.01); *G06T 7/40* (2013.01)

(58) Field of Classification Search
CPC ........... G06T 5/002; G06T 7/40; G06T 7/514; G06T 15/50; G06T 15/60; G06T 7/11;
(Continued)

(56) References Cited

U.S. PATENT DOCUMENTS

2012/0069181 A1* 3/2012 Xue .......................... G08G 1/16
348/241
2012/0307128 A1* 12/2012 Vorovitchik ............ G01J 3/447
348/336
(Continued)

FOREIGN PATENT DOCUMENTS

EP  2120007 A1  11/2009
JP  4317583 B2  8/2009
(Continued)

OTHER PUBLICATIONS

International Search Report and Written Opinion of PCT Application No. PCT/JP2019/003391, dated Apr. 16, 2019, 09 pages of ISRWO.

*Primary Examiner* — Jose L Couso
(74) *Attorney, Agent, or Firm* — CHIP LAW GROUP

(57) ABSTRACT

A polarization imaging unit generates, as polarization information, a polarization image including pixels in a plurality of polarization directions. An interpolation processing unit of an information processor performs interpolation processing using the polarization image obtained from the polarization imaging unit, and generates a polarization image for each polarization method. A polarization degree calculation unit calculates, for example, a polarization degree for each pixel as object surface information on the basis of the polarization image for each polarization method. A noise amount calculation unit calculates a noise amount for each pixel on the basis of the polarization image for each polarization method and the like. A polarization degree correction unit serves as an information correction unit, and corrects, according to the noise amount calculated by the noise amount calculation unit, the polarization degree that is object surface information calculated by the polarization degree calculation unit.

14 Claims, 15 Drawing Sheets

(58) Field of Classification Search
CPC ........... G06T 7/21; G06T 7/70; G06T 3/4038;
G06T 3/4076; G01B 11/24; G01B
11/002; G01B 11/2504; G01B 11/2518;
G06V 20/80; G06V 20/90; G06K
9/00577; G06K 2009/00583; B60R 1/00;
G02B 5/3025; G02B 5/201; G02B 21/06;
G02B 21/367; H04N 9/46; H04N 23/71;
H04N 23/10; H04N 23/12; H04N 23/133;
H04N 23/134; H04N 23/135; H04N
23/45; H04N 23/73; H04N 23/74; H04N
23/81; H04N 25/60; H04N 5/2621; H04N
23/60; G01J 3/447; G01J 3/0224; G01J
4/00

See application file for complete search history.

(56) References Cited

U.S. PATENT DOCUMENTS

| | | |
|---|---|---|
| 2013/0050570 A1 | 2/2013 | Ishigaki et al. |
| 2014/0092227 A1* | 4/2014 | Kanamori ......... H01L 27/14627 |
| | | 348/68 |
| 2018/0007291 A1 | 1/2018 | Ida et al. |

FOREIGN PATENT DOCUMENTS

| | | |
|---|---|---|
| JP | 2013-066166 A | 4/2013 |
| JP | 2018-005542 A | 1/2018 |
| WO | 2008/099589 A1 | 8/2008 |

* cited by examiner

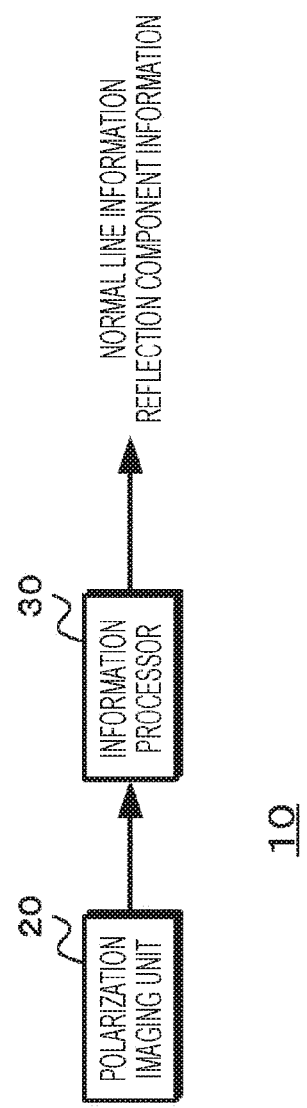

FIG. 10

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

LUT[σ][s]

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2019/003391 filed on Jan. 31, 2019, which claims priority benefit of Japanese Patent Application No. JP 2018-084919 filed in the Japan Patent Office on Apr. 26, 2018. Each of the above-referenced applications is hereby incorporated herein by reference in its entirety.

TECHNICAL FIELD

The present technology relates to an information processing apparatus, a method for processing information, and a program, and enables acquisition of object surface information that is robust to noise.

BACKGROUND ART

Conventionally, a polarization image has been used to detect, for example, a surface shape of a subject. For example, Patent Document 1 discloses a technique of calculating a polarization degree from a polarization image and discriminating, on the basis of the polarization degree, a shade area caused by the fact that the normal line of the subject does not face a light source and a shadow area caused by the fact that light is shielded by a shield.

CITATION LIST

Patent Document

Patent Document 1: Japanese Patent No. 4317583

SUMMARY OF THE INVENTION

Problems to be Solved by the Invention

Meanwhile, when the polarization image contains noise, object surface information such as a polarization degree obtained from the polarization image is affected by the noise, and accuracy of a process using the object surface information may be lowered.

In view of the above, it is an object of the present technology to provide an information processing apparatus, a method for processing information, and a program capable of obtaining object surface information that is robust to noise.

Solutions to Problems

A first aspect of the present technology is an information processing apparatus including: an information correction unit that corrects object surface information calculated on the basis of polarization information according to a noise amount of the polarization information.

According to the technology, a noise amount calculation unit calculates a noise amount of polarization information for each pixel on the basis of noise variance generated in a polarization imaging unit that has obtained the polarization information. The information correction unit calculates, on the basis of the polarization information, the object surface information that is, for example, any one of a polarization degree, a zenith angle, or a reflection component of an object surface for each pixel, and corrects the calculated object surface information according to the noise amount calculated by the noise amount calculation unit. The object surface information is corrected on the basis of change characteristic information indicating a change in the object surface information according to the noise amount. For example, the object surface information includes a polarization degree or a specular reflection component, and the information correction unit has, as characteristic information, a table showing, for each polarization degree, changed object surface information according to a noise amount for each noise amount, and sets the object surface information before the change corresponding to the changed object surface information that minimizes a difference from the object surface information calculated on the basis of the polarization information at the noise amount calculated by the noise amount calculation unit as corrected object surface information. Furthermore, the object surface information includes a zenith angle, and the information correction unit has, as change characteristic information, a table showing a change in a polarization degree according to a noise amount for each zenith angle, and sets a zenith angle corresponding to the polarization degree that minimizes a difference from the polarization degree calculated on the basis of the polarization information at the noise amount calculated by the noise amount calculation unit as a corrected zenith angle.

Furthermore, the information correction unit may set, as the corrected object surface information, object surface information corrected using the noise amount calculated by the noise amount calculation unit and a correction gain set on the basis of the object surface information calculated on the basis of the polarization information. In this case, the noise amount calculation unit calculates, as a noise amount, a ratio of the average luminance value of the polarization information to noise variance of the polarization information.

Furthermore, the object surface information includes a polarization degree or a specular reflection component, and the information correction unit corrects, according to the noise amount, a direct current component obtained by smoothing the object surface information calculated on the basis of the polarization information. Moreover, the information correction unit may use a difference between the object surface information calculated on the basis of the polarization information and the direct current component as an alternating current component of the object surface information, and may set an addition result of the alternating current component and the direct current component corrected according to the noise amount as corrected object surface information. Furthermore, the object surface information includes a zenith angle, and the information correction unit may use a zenith angle for the polarization degree that minimizes a difference from the direct current component obtained by smoothing the polarization degree calculated on the basis of the polarization information as a corrected zenith angle for the direct current component, and may add, to the zenith angle, a zenith angle according to the alternating current component of the polarization degree calculated on the basis of the polarization information to obtain a corrected zenith angle.

Moreover, the information processing apparatus may further include a polarization imaging unit that obtains polarization information, a normal line information generation unit that generates normal line information on the basis of the object surface information corrected by the information correction unit, or a diffuse reflection calculation unit that calculates a non-polarization component from the polarization information and subtracts the specular reflection component corrected by the information correction unit from the non-polarization component to calculate a diffuse reflection component.

A second aspect of the present technology is a method for processing information including:

correcting, using an information correction unit, object surface information calculated on the basis of polarization information according to a noise amount of the polarization information.

A third aspect of the present technology is a program for causing a computer to execute calculation of object surface information based on polarization information, the program that causes the computer to execute:

correcting the object surface information calculated on the basis of the polarization information according to a noise amount of the polarization information.

Note that the program according to the present technology is, for example, a program that can be provided in a computer readable format by, to a general-purpose computer capable of executing various program codes, a storage medium such as an optical disk, a magnetic disk, and a semiconductor memory, or a communication medium such as a network. By providing such a program in the computer readable format, processing according to the program is implemented on the computer.

Effects of the Invention

According to the present technology, a noise amount of polarization information is calculated, and object surface information calculated on the basis of the polarization information is corrected according to the calculated noise amount. Therefore, the object surface information that is robust to noise can be obtained. Note that the effects described herein are merely examples and are not limited, and there may be additional effects.

BRIEF DESCRIPTION OF DRAWINGS

FIG. 1 is a diagram exemplifying a configuration of a system using an information processing apparatus.

FIG. 10 is a diagram exemplifying a filter coefficient of a Gaussian filter.

MODE FOR CARRYING OUT THE INVENTION

Hereinafter, embodiments for implementing the present technology will be described. Note that descriptions will be given in the following order.

1. Configuration of Information Processing System
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Other Embodiments
12. Application Example <1. Configuration of Information Processing System>

FIG. 1 exemplifies a configuration of a system using an information processing apparatus according to the present technology. An information acquisition system 10 includes a polarization imaging unit 20 and an information processor 30.

Figure 2A:
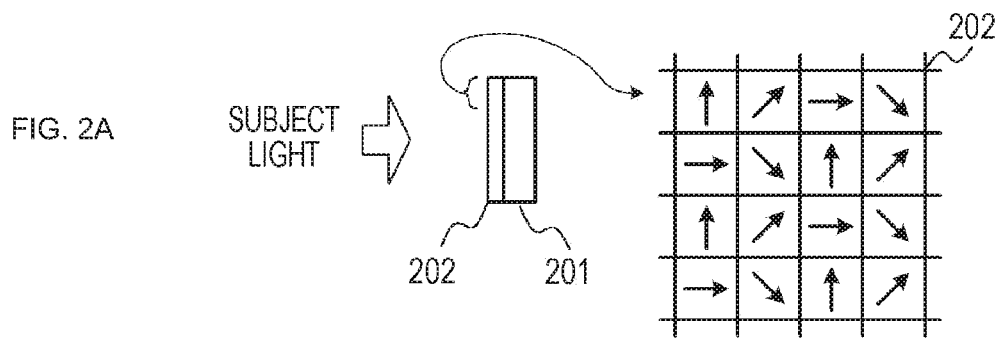
FIGS. 2A, 2B, 2C, and 2D are diagrams exemplifying a configuration of a polarization imaging unit.
Figure 2B:
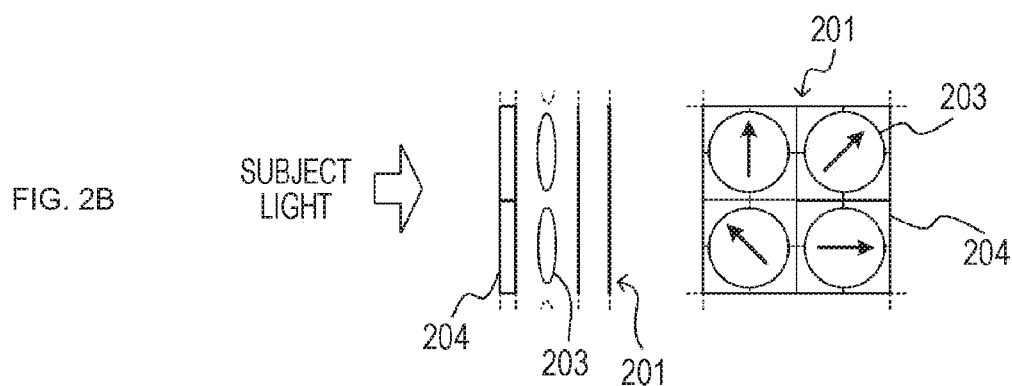
Figure 2C:
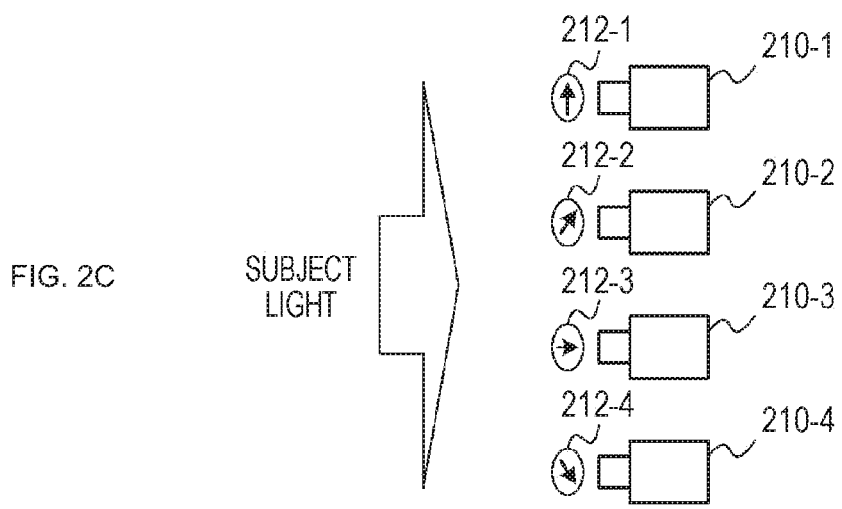
Figure 2D:
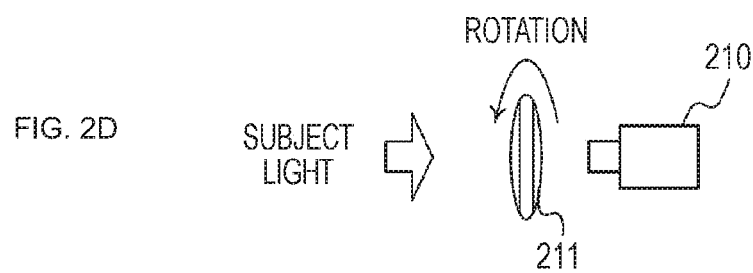

The polarization imaging unit 20 obtains polarization images having different polarization directions of at least three directions (the polarization direction may include non-polarization), and outputs the images to the information processor 30. FIGS. 2A, 2B, 2C, and 2D exemplify a configuration of the polarization imaging unit that obtains a polarization image. For example, as illustrated in FIG. 2A, the polarization imaging unit 20 has a configuration in which a polarizing filter 202 having pixels in a plurality of polarization directions is disposed on an image sensor 201 provided with a mosaic filter (not illustrated) on the imaging surface. An image is captured using the polarization imaging unit 20 having such a configuration, whereby a polarization image having polarization components in a plurality of directions can be obtained. Note that FIG. 2A exemplifies a case where the polarizing filter 202 in which each pixel is any of four different polarization directions (polarization directions are indicated by arrows) is disposed on the front surface of the image sensor 201. Furthermore, as illustrated in FIG. 2B, the polarization imaging unit 20 may generate a polarization image having polarization components in a plurality of directions using a configuration of a multi-lens array. For example, a plurality of lenses 203 (four in the drawing) is provided on the front surface of the image sensor 201, and an optical image of a subject is captured on the imaging surface of the image sensor 201 using each lens 203. Furthermore, a polarizer 204 is provided on the front surface of each lens 203, and a polarization direction of each polarizer 204 is made different. With the polarization imaging unit 20 configured in this manner, a polarization image having polarization components in a plurality of directions can be obtained by one image capturing. Furthermore, as illustrated in FIG. 2C, polarizers 212-1 to 212-4 having different polarization directions may be provided in front of imaging units 210-1 to 210-4, respectively, and a plurality of polarization images having different polarization directions may be generated from a plurality of different viewpoints. In this case, if positional intervals between the respective lenses 203 and the imaging units 210-1 to 210-4 are negligibly small with respect to the distance to the subject, a parallax can be ignored in the plurality of polarization images having different polarization directions. Furthermore, in a case where the parallax cannot be ignored, the polarization images having different polarization directions are aligned according to the parallax amount. Furthermore, in a case where the movement of the subject to be recognized is slow or in a case where the subject to be recognized operates stepwise, a polarizer 211 may be provided in front of the imaging unit 210 as illustrated in FIG. 2D. In this case, the polarizer 211 rotates to capture images in a plurality of different polarization directions, and obtains a plurality of polarization images having different polarization directions.

The information processor 30 corrects object surface information calculated on the basis of polarization information obtained by the polarization imaging unit 20 according to the noise amount of the polarization information. The information processor 30 calculates, as the object surface information, a polarization degree, a zenith angle, or a reflection component of the object surface from the polarization information, which is, for example, a polarization image. Furthermore, the information processor 30 corrects the calculated object surface information according to the noise amount of the polarization image on the basis of change characteristic information indicating a change of the object surface information depending on the noise amount. Hereinafter, embodiments of the information processor will be described.

2. First Embodiment

Next, a first embodiment will be described. In the first embodiment, a case where object surface information is a polarization degree will be described.

Figure 3:
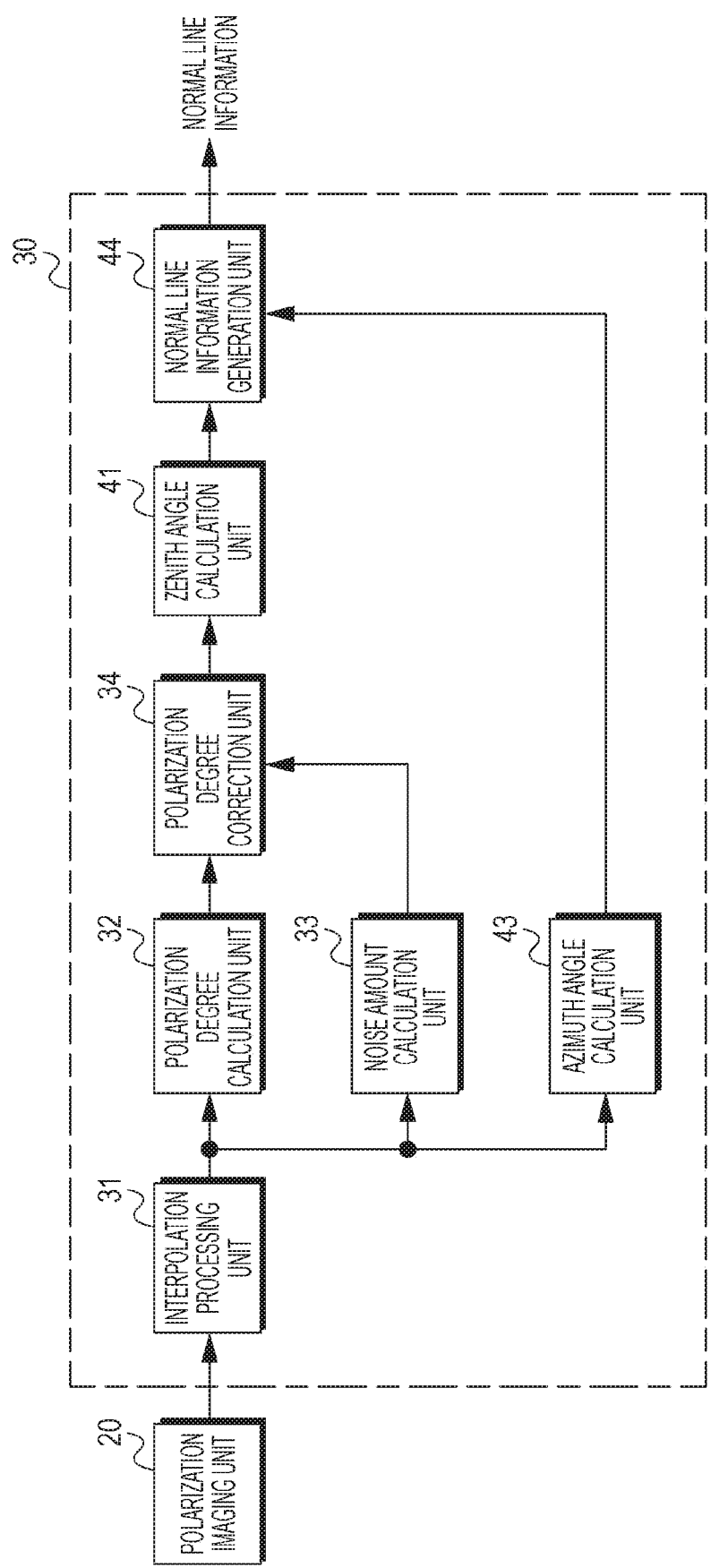
FIG. 3 is a diagram exemplifying a configuration of a first embodiment.

FIG. 3 exemplifies a configuration of the first embodiment. An information processor 30 includes an interpolation processing unit 31, a polarization degree calculation unit 32, a noise amount calculation unit 33, and a polarization degree correction unit 34. Furthermore, in a case where the information processor 30 generates normal line information, a zenith angle calculation unit 41, an azimuth angle calculation unit 43, and a normal line information generation unit 44 may be further provided. Furthermore, the interpolation processing unit 31 may be provided in a polarization imaging unit 20. Note that the polarization degree correction unit 34 corresponds to an information correction unit in the first embodiment and second to fourth embodiments to be described later.

The interpolation processing unit 31 carries out interpolation processing using image signals of a polarization image that is generated by the polarization imaging unit 20 and includes pixels for each of a plurality of polarization components, and generates a polarization image for each polarization component. In the interpolation processing, for example, a preset function is used to calculate a pixel signal of a pixel to be interpolated on the basis of a pixel signal of a pixel of the same polarization component located in the vicinity of the pixel to be interpolated. The interpolation processing unit 31 outputs the generated polarization image for each polarization component to the polarization degree calculation unit 32, the noise amount calculation unit 33, and the azimuth angle calculation unit 43.

Figure 4:
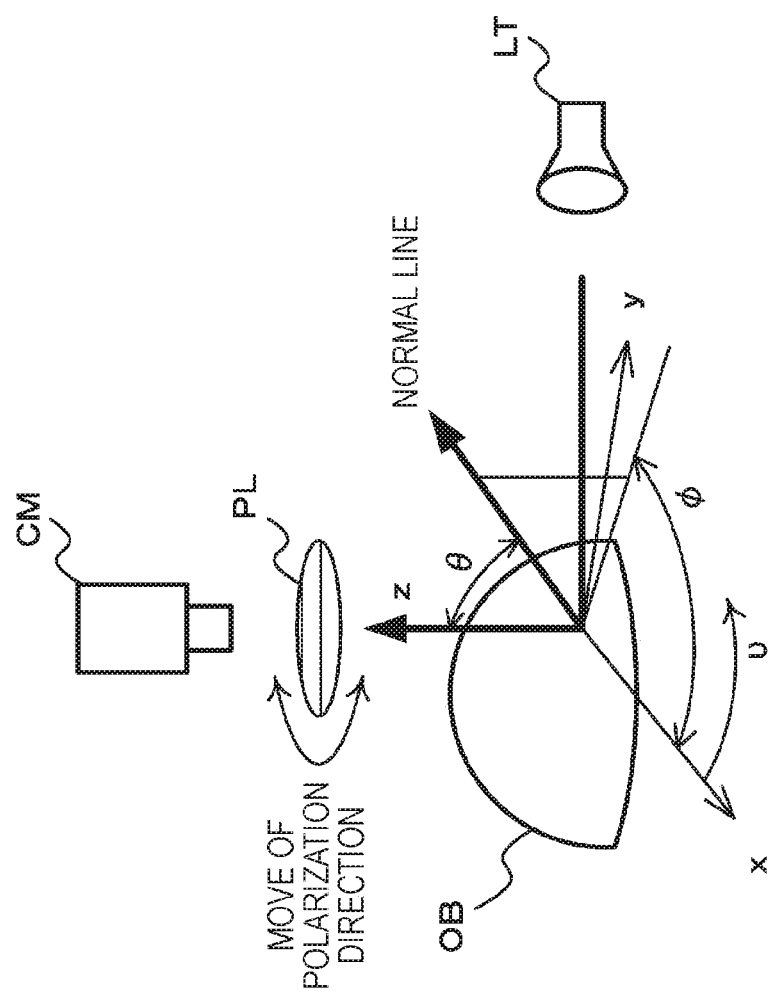
FIG. 4 is a diagram for illustrating a relationship between a polarization image and a polarization degree.

The polarization degree calculation unit 32 calculates a polarization degree on the basis of the polarization image for each polarization component. Here, a relationship between the polarization image and the polarization degree will be described. As illustrated in FIG. 4, for example, a light source LT is used to illuminate an object OB, and an imaging unit CM images the object OB via a polarizer PL. In this case, in the captured image, brightness of the object OB changes depending on the polarization direction of the polarizer PL. Note that the highest luminance is set as Imax and the lowest luminance is set as Imin. Furthermore, with an x-axis and a y-axis in two-dimensional coordinates set on the plane of the polarizer PL, an angle in the y-axis direction with respect to the x-axis is set as a polarization angle υ indicating the polarization direction (transmission axis angle) of the polarizer PL. The polarizer PL returns to the original polarization state when the polarization direction rotates by 180 degrees, and has a cycle of 180 degrees. Furthermore, the polarization angle υ when the highest luminance Imax is observed is set as an azimuth angle φ. With such a definition, when the polarization direction of the polarizer PL changes, the luminance I (υ) to be observed can be expressed by a polarization model formula of the formula (1). Note that FIG. 5 exemplifies a relationship between the luminance and the polarization angle. The parameters a, b, and c in the formula (1) are parameters that represent the Cos waveform based on polarization.

[Numeral 1]

$$I(\upsilon)=a\cdot\sin 2\upsilon+b\cdot\cos 2\pi+c \quad (1)$$

Here, luminance values in four polarization directions, for example, the observed value when the polarization angle υ is "υ=0 degree" is set as a luminance value I0, the observed value when the polarization angle υ is "υ=45 degrees" is set as a luminance value I45, the observed value when the polarization angle υ is "υ=90 degrees" is set as a luminance value I90, and the observed value when the polarization angle υ is "υ=135 degrees" is set as I135. Furthermore, when the formula (1) is expressed as the formula (2), the luminance I (υ) becomes a matrix expressed in the formula (3), and the coefficient A becomes a matrix expressed in the formula (4). Therefore, the parameters a, b, and c are to be values calculated on the basis of the formula (5). Note that, although detailed description is omitted, since the polarization model formula has three parameters, the parameters a, b, and c can be calculated using the luminance values in three polarization directions.

[Numeral 2]

$$I(\upsilon)=A\cdot(a,b,c)^T \quad (2)$$

$$I(\upsilon)=(I_0, I_{45}, I_{90}, I_{135})^T \quad (3)$$

$$A = \begin{bmatrix} \sin(2\cdot 0°) & \cos(2\cdot 0°) & 1 \\ \sin(2\cdot 45°) & \cos(2\cdot 45°) & 1 \\ \sin(2\cdot 90°) & \cos(2\cdot 90°) & 1 \\ \sin(2\cdot 135°) & \cos(2\cdot 135°) & 1 \end{bmatrix} = \begin{bmatrix} 0 & 1 & 1 \\ 1 & 0 & 1 \\ 0 & -1 & 1 \\ -1 & 0 & 1 \end{bmatrix} \quad (4)$$

$$\begin{bmatrix} a \\ b \\ c \end{bmatrix} = \begin{bmatrix} 0 & \frac{1}{2} & 0 & -\frac{1}{2} \\ \frac{1}{2} & 0 & -\frac{1}{2} & 0 \\ \frac{1}{4} & \frac{1}{4} & \frac{1}{4} & \frac{1}{4} \end{bmatrix} \begin{bmatrix} \frac{I_{45}-I_{135}}{2} \\ \frac{I_0-I_{90}}{2} \\ \frac{I_0+I_{45}+I_{90}+I_{135}}{4} \end{bmatrix} \quad (5)$$

The polarization degree calculation unit 32 calculates a polarization degree ρ for each pixel on the basis of the formula (6), and outputs it to the polarization degree correction unit 34. Note that the parameters a, b, and c in the formula (6) are values calculated on the basis of the formula (5).

[Numeral 3]

$$p = \frac{\sqrt{a^2 + b^2}}{c} \quad (6)$$

The noise amount calculation unit 33 calculates a noise amount on the basis of the polarization image for each polarization component. The noise amount calculation unit 33 calculates, as a noise amount, variance of noise in the average luminance value of the polarization image for each polarization component on the basis of a preset noise model expressed by, for example, the formula (7). Note that the average luminance value corresponds to the parameter c in the formula (5). In the formula (7), the coefficient "n0" is a coefficient used to calculate the variance of shot noise distribution when output from an image sensor 201 is the average luminance value. Furthermore, the coefficient "n1" corresponds to the variance of thermal noise distribution of the image sensor 201. Furthermore, the noise amount calculation unit 33 calculates a noise amount SNR for each pixel using the average luminance value (parameter c) and variance σ on the basis of the formula (8). Note that the unit of the noise amount expressed in the formula (8) is decibel.

[Numeral 4]

$$\sigma = n_0 \sqrt{c} + n_1 \quad (7)$$

$$SNR = 20\log_{10}\frac{c}{\sigma} \quad (8)$$

Furthermore, the noise amount calculation unit 33 may perform at least one of filtering processing in the temporal direction or in the spatial direction so that the influence of noise can be reduced even if the noise is superimposed on the average luminance value. For example, average luminance values of a plurality of frames at the pixel position to be subject to noise calculation may be averaged to obtain the average luminance value at the pixel position to be subject to the noise calculation, or average luminance values of pixels within a predetermined range based on the pixel position to be subject to the noise calculation may be averaged to obtain the average luminance value at the pixel position to be subject to the noise calculation. In this manner, by reducing the influence of noise on the average luminance value, it becomes possible to stably calculate the noise amount. The noise amount calculation unit 33 outputs the calculated noise amount to the polarization degree correction unit 34.

The polarization degree correction unit 34 corrects the polarization degree on the basis of the polarization degree calculated by the polarization degree calculation unit 32 and the noise amount calculated by the noise amount calculation unit 33. The polarization degree correction unit 34 has, as change characteristic information, a look-up table LUT [SNR] [ρ] that indicates, for each polarization degree, the changed polarization degree according to the noise amount for each noise amount. The polarization degree correction unit 34 uses the polarization degree (ρin) calculated by the polarization degree calculation unit 32, the noise amount SNR calculated by the noise amount calculation unit 33, and the look-up table LUT [SNR] [ρ] to output a corrected polarization degree ρout.

The formula (9) expresses a generation formula of the look-up table LUT [SNR] [ρ]. Furthermore, the variable λ in the formula (9) indicates a value calculated on the basis of the formula (10), and I0( ) and I1( ) in the formula (9) and the formula (37) to be described later indicate a modified Bessel function of the first kind as expressed in the formula (11).

[Numeral 5]

$$LUT[SNR][\rho] = \frac{\sqrt{\pi}}{2 \cdot 10^{\frac{SNR}{20}}} e^{\frac{-\lambda^2}{4}} \left[ \left(1 + \frac{\lambda^2}{2}\right) I_0\left(\frac{\lambda^2}{4}\right) + \left(\frac{\lambda^2}{2}\right) I_1\left(\frac{\lambda^2}{4}\right) \right] \quad (9)$$

$$\lambda = \sqrt{2}\rho \cdot 10^{\frac{SNR}{20}} \quad (10)$$

$$I_\alpha(x) = \sum_{m=0}^{\infty} \frac{1}{m! \, \Gamma(m + \alpha + 1)} \left(\frac{x}{2}\right)^{2m+\alpha} \quad (11)$$

Figure 6:
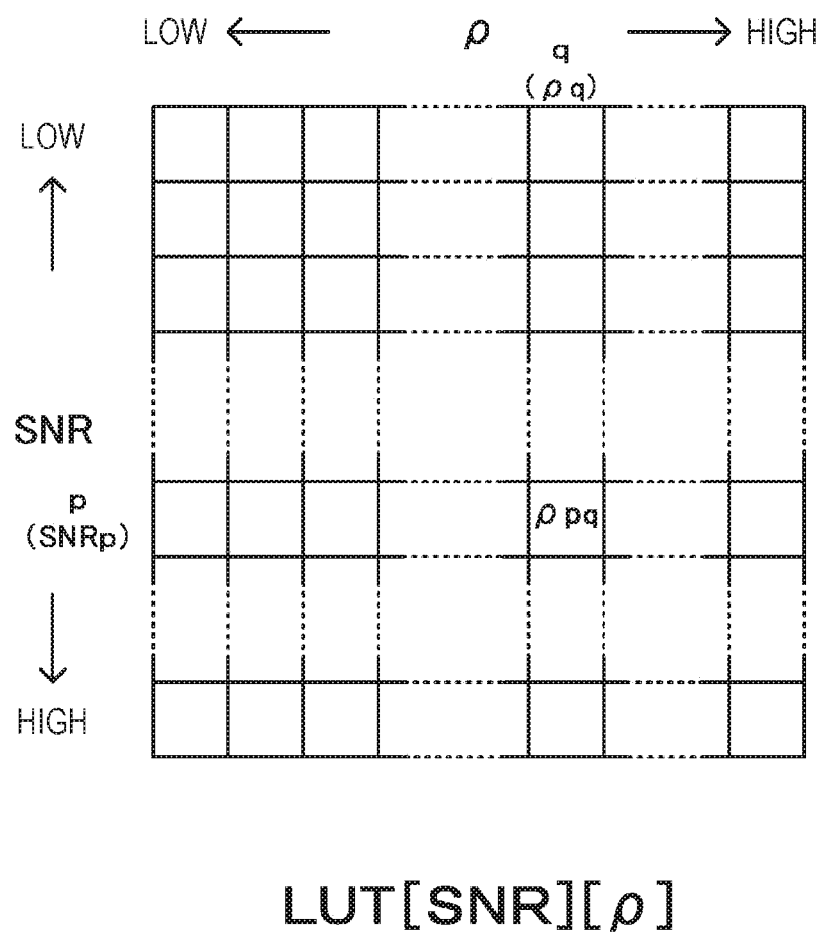
FIG. 6 is a diagram illustrating a look-up table LUT [SNR][ρ].

FIG. 6 exemplifies the look-up table LUT [SNR] [ρ]. The look-up table LUT [SNR] [ρ] shows the polarization degree ρ before a change in the row direction and the noise amount SNR in the column direction, and the coordinate position specified by the polarization degree ρ and the noise amount SNR indicates a changed polarization degree representing how the polarization degree ρ changes at the time of the noise amount SNR.

The polarization degree correction unit 34 performs the calculation of the formula (12) using the polarization degree ρin calculated by the polarization degree calculation unit 32, the noise amount SNR calculated by the noise amount calculation unit 33, and the look-up table, and the polarization degree before the change corresponding to the changed polarization degree that minimizes the difference from the calculated polarization degree ρin in the calculated noise amount SNR is set as the corrected polarization degree ρout.

[Numeral 6]

$$\rho_{out} = \underset{\rho}{\mathrm{argmin}}(\rho_{in} - LUT[SNR][\rho]) \quad (12)$$

For example, when the noise amount SNR calculated by the noise amount calculation unit 33 is SNRp, the row of p in the look-up table LUT [SNR] [ρ] is used. Furthermore, when the difference between the changed polarization degree ρpq and the polarization degree ρin is minimized in the row of p, the polarization degree ρq in the column of q of the changed polarization degree ρpq is set as the corrected polarization degree ρout.

The polarization degree correction unit 34 outputs the corrected polarization degree to the zenith angle calculation unit 41. Since the polarization degree ρ is calculated on the basis of the formula (6) mentioned above, if an error occurs in the parameters a and b due to noise, an error in the direction in which the polarization degree ρ increases occurs regardless of whether the direction of the error is positive or negative. However, the polarization degree correction unit 34 can output the polarization degree with reduced errors to the zenith angle calculation unit 41.

The zenith angle calculation unit 41 calculates a zenith angle using the corrected polarization degree supplied from the polarization degree correction unit 34. The zenith angle calculation unit 41 calculates a zenith angle θ on the basis of the formula (13). The formula (13) is a calculation formula of the case where diffuse reflection is dominant, and parameters A, B, C, and D are calculated on the basis of the formulae (14) to (17). Furthermore, a parameter n indicates a relative refractive index in the formulae (14), (15), and (17). For example, the relative refractive index is uniformly set to n=1.6.

[Numeral 7]

$$\theta = \arcsin\left(\sqrt{-B\frac{C(A+B) - \sqrt{C^2(A+B)^2 - D^2(A^2 - B^2)}}{2(A^2 - B^2)}}\right) \quad (13)$$

$$A = 2(1-\rho) - (1+\rho)\left(n^2 + \frac{1}{n^2}\right) \quad (14)$$

$$B = 4\rho \quad (15)$$

$$C = 1 + n^2 \quad (16)$$

$$D = 1 - n^2 \quad (17)$$

Furthermore, in a case where specular reflection is dominant, which is, for example, in a case where the subject is determined that the specular reflection is dominant by image recognition or the like, or in a case where a user or the like instructs the specular reflection, the zenith angle calculation unit 41 calculates the zenith angle using the formula (18). Note that the parameters A and B in the formula (18) are calculated on the basis of the formulae (19) and (20).

[Numeral 8]

$$\theta = \arcsin\left(\sqrt{\pm\frac{1}{2}\sqrt{\frac{\sqrt{2}(n^6 - n^4 - n^2 + 1)}{2(\rho^2 - 1)\sqrt{\frac{A+B}{\rho^2 - 1}}} - \frac{A + (n^2 + 1)^2 \rho^2}{8(\rho^2 - 1)} + \frac{\rho^2(n^2 - 1)^2 - 2(n^4 + 1)}{4(\rho^2 - 1)}} - \frac{1}{4\sqrt{2}}\sqrt{\frac{A+B}{\rho^2 - 1}} + \frac{n^2 + 1}{4}}\right) \quad (18)$$

$$A = \rho\sqrt{(n^8 - 12n^6 + 38n^4 - 12n^2 + 1)\rho^2 + 16n^2(n^2 - 1)^2} \quad (19)$$

$$B = (n^4 - 6n^2 + 1)\rho^2 - 2(n^2 - 1)^2 \quad (20)$$

Figure 7:
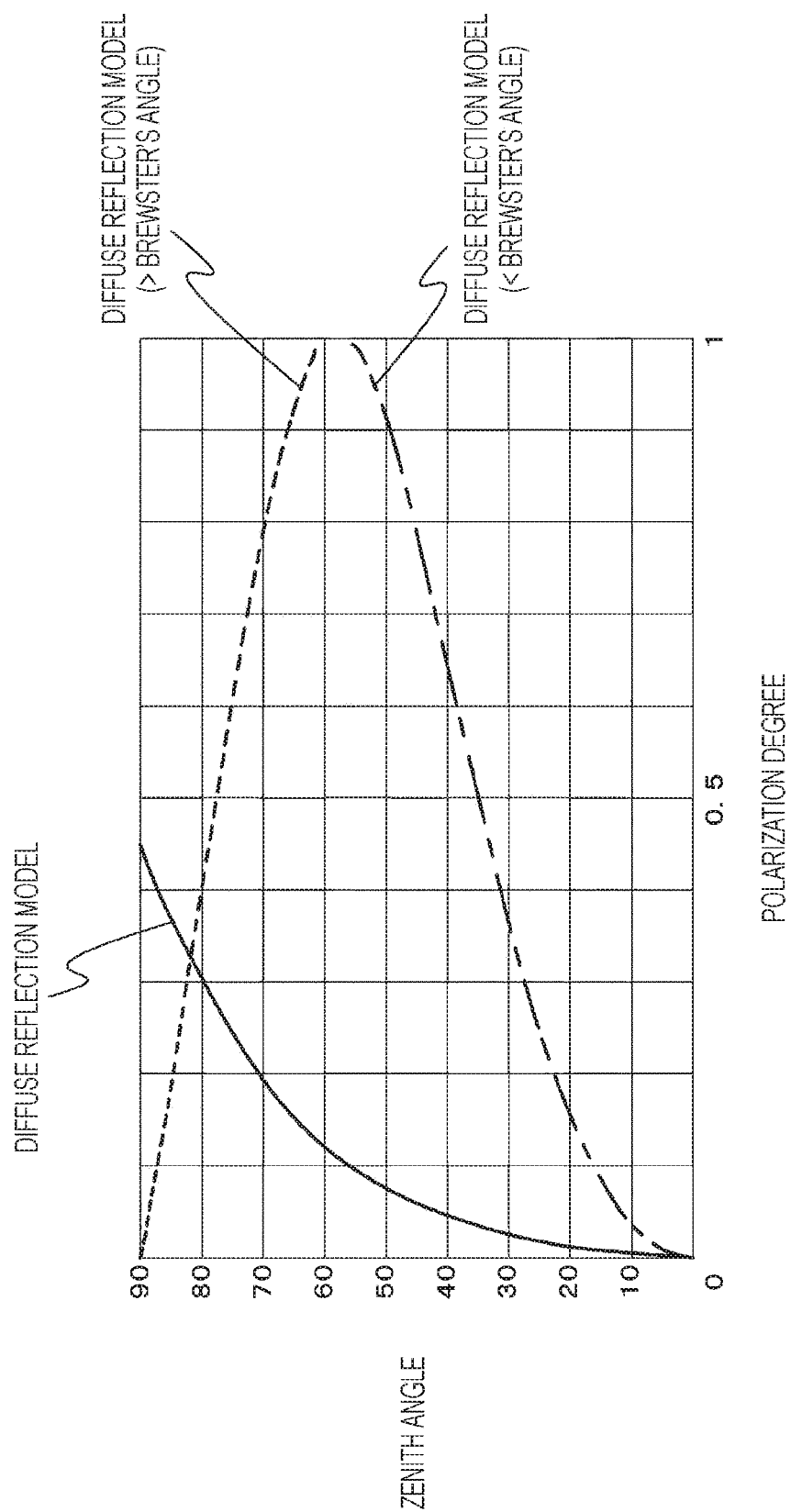
FIG. 7 is a graph illustrating a relationship between a polarization degree and a zenith angle.

FIG. 7 illustrates a relationship between the polarization degree and the zenith angle. In the specular reflection model, two zenith angles are calculated for the polarization degree, and one of the zenith angles is used. For example, in selecting the zenith angle, information corresponding to the normal line may be calculated from information of a distance sensor or the like to select the zenith angle on the basis of the calculation result, or the smaller zenith angle may be constantly selected to stabilize the selection result, for example.

The azimuth angle calculation unit 43 calculates an azimuth angle on the basis of the luminance value for each polarization direction. The azimuth angle calculation unit 43 calculates the azimuth angle φ on the basis of the formula (21) in a case where the diffuse reflection is dominant, and calculates the azimuth angle φ on the basis of the formula (22) in a case where the specular reflection is dominant. Note that the parameters a, b, and c in the formulae (21) and (22) are values calculated on the basis of the formula (5).

[Numeral 9]

$$\varphi = \frac{1}{2}\arctan\frac{a}{b} \quad (21)$$

$$\varphi = \frac{1}{2}\left(\arctan\frac{a}{b} + \pi\right) \quad (22)$$

Figure 8:
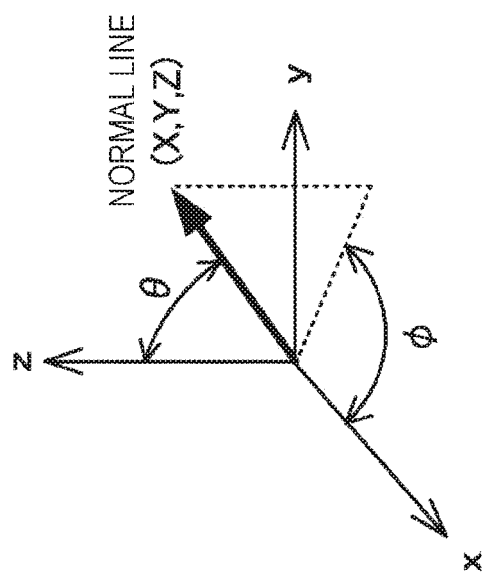
FIG. 8 is a diagram illustrating normal line information.

The normal line information generation unit 44 performs the calculation of the formulae (23) to (25) using the zenith angle C calculated by the zenith angle calculation unit 41 and the azimuth angle φ calculated by the azimuth angle calculation unit 43, and generates normal line information indicating a three-dimensional vector (X, Y, Z) of a normal line as illustrated in FIG. 8.

$$X = \cos\varphi \cdot \sin\theta \quad (23)$$

$$Y = \sin\varphi \cdot \sin\theta \quad (24)$$

$$Z = \cos\theta \quad (25)$$

Figure 9:
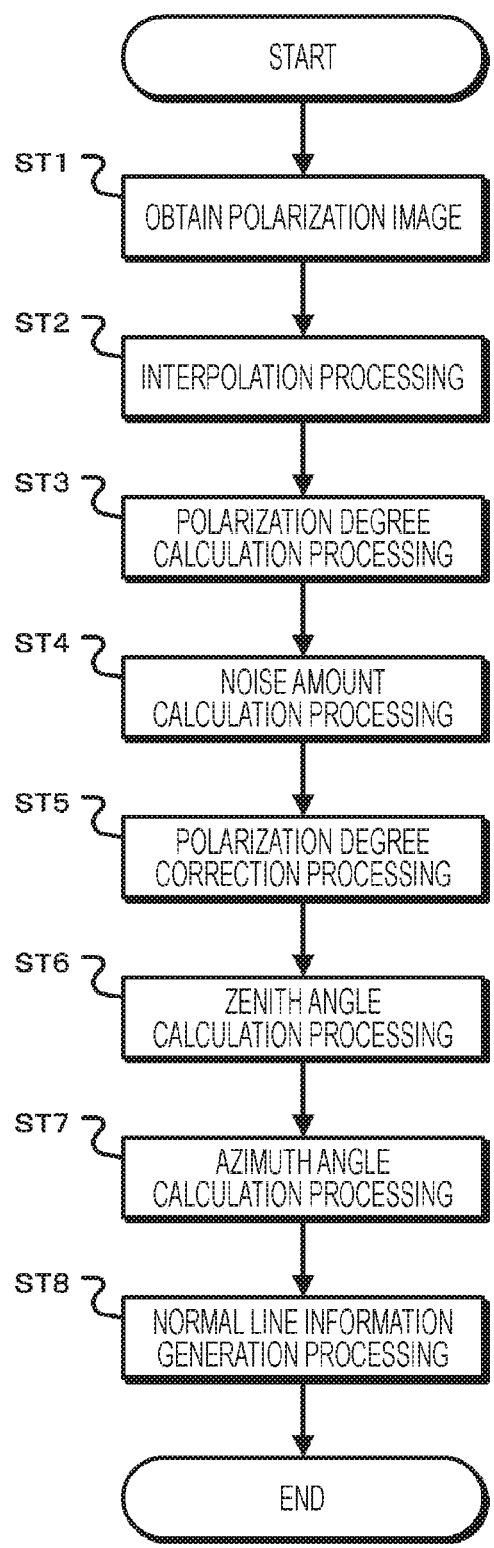
FIG. 9 is a flowchart exemplifying operation of the first embodiment.

Next, operation of the first embodiment will be described. FIG. 9 is a flowchart exemplifying the operation of the first embodiment. In step ST1, the information processor 30 obtains a polarization image. The information processor 30 obtains the polarization image generated by the polarization imaging unit 20, and the process proceeds to step ST2.

In step ST2, the information processor 30 performs interpolation processing. The interpolation processing unit 31 of the information processor 30 performs the interpolation processing using the polarization image obtained in step ST1, generates a polarization image for each polarization component from the polarization image including pixels for each of a plurality of polarization components, and the process proceeds to step ST3.

In step ST3, the information processor 30 performs processing of polarization degree calculation. The polarization degree calculation unit 32 of the information processor 30 performs the calculation of the formula (6) for each pixel using the polarization image for each polarization component, calculates the polarization degree ρ, and the process proceeds to step ST4.

In step ST4, the information processor 30 performs processing of noise amount calculation. The noise amount calculation unit 33 of the information processor 30 performs the calculation of the formula (8) for each pixel using the polarization image for each polarization component, calculates the noise amount SNR, and the process proceeds to step ST5.

In step ST5, the information processor 30 performs processing of polarization degree correction. The polarization degree correction unit 34 of the information processor 30 uses the look-up table LUT [SNR] [ρ] stored in advance to obtain a corrected polarization degree on the basis of the polarization degree calculated in step ST3 and the noise amount calculated in step ST4, and the process proceeds to step ST6.

In step ST6, the information processor 30 performs processing of zenith angle calculation. The zenith angle calculation unit 41 of the information processor 30 performs the calculation of the formula (13) for each pixel using the corrected polarization degree obtained in step ST5, calculates the zenith angle θ, and the process proceeds to step ST7.

In step ST7, the information processor 30 performs the processing of azimuth angle calculation. The azimuth angle calculation unit 43 of the information processor 30 performs the calculation of the formula (21) using the polarization image for each polarization component assuming that the diffuse reflection is dominant, for example, and calculates the azimuth angle φ. Furthermore, in a case where the specular reflection is dominant obviously, the azimuth angle φ is calculated on the basis of the formula (22). The azimuth angle calculation unit 43 calculates the azimuth angle using the polarization image for each polarization component, and the process proceeds to step ST8.

In step ST8, the information processor 30 performs processing of normal line information generation. The normal line information generation unit 44 of the information processor 30 performs the calculation of the formulae (23) to (25) using the zenith angle θ calculated in step ST6 and the azimuth angle φ calculated in step ST7, and generates the normal line information indicating the three-dimensional vector (X, Y, Z) of the normal line.

Note that, in FIG. 9, either of steps ST3 and ST4 may be performed first, and the polarization degree and the noise amount may be calculated by parallel processing. Furthermore, the processing of azimuth angle calculation in step ST7 may be carried out at any timing as long as it is after the interpolation processing and before the processing of normal line information generation. Moreover, in a case where the polarization image to be obtained in step ST1 is an image for each polarization direction, it is not required to perform the interpolation processing of step ST2.

As described above, according to the first embodiment, a polarization degree in which the influence of noise is corrected can be calculated on the basis of change characteristic information indicating a change in polarization degree according to the noise amount. Furthermore, with respect to the polarization degree ρ calculated on the basis of the formula (6), if an error occurs in the parameters a and b due to noise, an error in the direction in which the polarization degree ρ increases occurs regardless of whether the direction of the error is positive or negative. However, since the polarization degree in which the influence of noise is corrected can be calculated, accurate normal line information can be generated using the corrected polarization degree.

3. Second Embodiment

Next, a second embodiment will be described. The second embodiment has a configuration simpler than that of the first embodiment.

An information processor 30 according to the second embodiment has a configuration similar to that of the first embodiment, and operation of a polarization degree correction unit is different from that of the first embodiment. A polarization degree correction unit 34 uses a correction gain function as change characteristic information indicating a change in the polarization degree according to the noise amount. The polarization degree correction unit 34 calculates, on the basis of a correction gain function g (SNR, ρin), a correction gain according to a noise amount SNR calculated by a noise amount calculation unit 33 and a polarization degree (ρin) calculated by a polarization degree calculation unit 32 on the basis of a polarization image, and corrects the polarization degree ρin using the calculated correction gain. The formula (26) expresses a correction formula of the polarization degree. Furthermore, the formula (27) expresses the correction gain function g (SNR, ρin), and a variable t is a value calculated on the basis of the formula (28). Note that, in the formula (28), a parameter th0 indicates a value expressed by the formula (29), and a parameter th1 indicates a value calculated on the basis of the formula (30).

[Numeral 10]

$$\rho_{out} = g(SNR, \rho_{in}) \cdot \rho_{in} \quad (26)$$

$$g(SNR, \rho_{in}) = t^2(-2t+3) \quad (27)$$

$$t = \min\left(\max\left(\frac{\rho_{in} - th0}{th1 - th0}, 0\right), 1\right) \quad (28)$$

$$th0 = 0 \quad (29)$$

$$th1 = \frac{\sqrt{\pi}}{2 \cdot 10^{\frac{SNR_{[db]}}{20}}} \quad (30)$$

The operation of the second embodiment is similar to that of the first embodiment illustrated in FIG. 9, and the processing of polarization degree correction of step ST5 is different. That is, the polarization degree correction unit 34 of the information processor 30 obtains a corrected polarization degree using the polarization degree calculated in step ST3, the noise amount calculated in step ST4, and the correction gain function g (SNR, ρin).

As described above, according to the second embodiment, the polarization degree in which the influence of noise is corrected can be calculated and accurate normal line information can be generated in a similar manner to the first embodiment. Furthermore, according to the second embodiment, it becomes possible to correct the polarization degree using the correction gain function g (SNR, ρin), whereby a look-up table LUT [SNR][ρ] is not required to be stored as in the first embodiment, and a configuration can be made simpler than that of the first embodiment.

4. Third Embodiment

Next, a third embodiment will be described. In the third embodiment, a calculation cost is made lower than that in the second embodiment.

An information processor 30 according to the third embodiment has a configuration similar to that of the second embodiment, and operation of a noise calculation unit and a polarization degree correction unit is different from that of the second embodiment.

The noise amount calculation unit 33 calculates a noise amount on the basis of the polarization image for each polarization component. The noise amount calculation unit 33 calculates a noise amount in the average luminance value of the polarization image for each polarization component on the basis of a preset noise model expressed by, for example, the formula (7). Note that the average luminance value corresponds to the parameter c in the formula (5). Furthermore, the noise amount calculation unit 33 sets the ratio of the average luminance value to the noise variance as the noise amount. That is, the noise amount calculation unit 33 calculates a noise amount SNR [ratio] for each pixel using the average luminance value (parameter c) and variance σ on the basis of the formula (31).

$$SNR_{[ratio]} = c/\sigma \quad (31)$$

Furthermore, as described above, the noise amount calculation unit 33 may perform at least one of filtering processing in the temporal direction or in the spatial direction so that the influence of noise can be reduced even if the noise is superimposed on the average luminance value. The noise amount calculation unit 33 outputs the calculated noise amount to the polarization degree correction unit 34.

The polarization degree correction unit 34 performs the correction calculation of the formula (26) using the correction gain function g (SNR, ρin) expressed by the formula (27), and calculates a corrected polarization degree ρout. Furthermore, since the noise amount $SNR_{[ratio]}$ calculated by the noise amount calculation unit 33 is a ratio of the average luminance value (parameter c) to the variance σ, the calculation formula of the parameter th1 is expressed as the formula (32), and the parameter th1 can be calculated more easily than the formula (30) in the second embodiment.

[Numeral 11]

$$th1 = \frac{\sqrt{\pi}}{2 \cdot SNR_{[ratio]}} \quad (32)$$

The operation of the third embodiment is similar to that of the first embodiment illustrated in FIG. 9, and the processing of noise amount calculation of step ST4 and the processing of polarization degree correction of step ST5 are different. That is, the noise amount calculation unit 33 of the information processor 30 calculates the ratio of the average luminance value to the variance as the noise amount $SNR_{[ratio]}$, and the polarization degree correction unit 34 obtains the corrected polarization degree using the polarization degree calculated in step ST3, the noise amount $SNR_{[ratio]}$ calculated in step ST4, and the correction gain function g (SNR, ρin).

According to the third embodiment as described above, the polarization degree in which the influence of noise is corrected can be calculated and accurate normal line information can be generated in a similar manner to the first embodiment. Furthermore, according to the third embodiment, the ratio of the average luminance value to the variance is used as the noise amount calculated by the noise amount calculation unit 33, whereby the calculation cost can be reduced compared with the second embodiment.

5. Fourth Embodiment

Next, a fourth embodiment will be described. The fourth embodiment has a configuration that is more robust to variations in polarization degree than those in the first to third embodiments.

An information processor 30 according to the fourth embodiment has a configuration similar to that of the second embodiment, for example, and operation of a polarization degree correction unit is different from that of the second embodiment.

A polarization degree correction unit 34 corrects a direct current component (DC component) obtained by smoothing a polarization degree ρin calculated by a polarization degree calculation unit 32 according to a noise amount SNR. Moreover, the polarization degree correction unit 34 adds an alternating current component (AC component) of the polarization degree to the corrected DC component to calculate a corrected polarization degree ρout. The formula (33) expresses a correction formula of the polarization degree.

[Numeral 12]

$$\rho_{out} = g(SNR, \rho_{dc}) \cdot \rho_{dc} + (\rho_{in} - \rho_{dc}) \quad (33)$$

Figure 10:
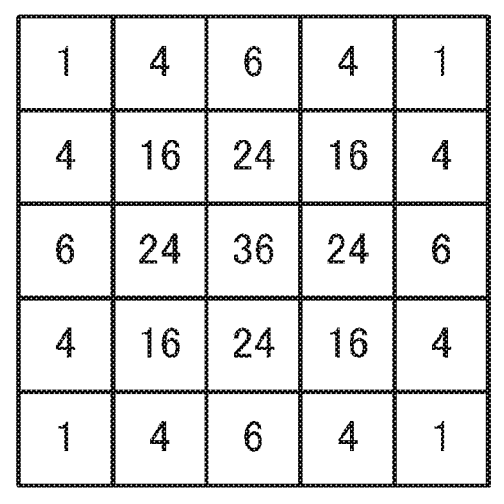

Any method may be used to calculate the DC component ρdc of the polarization degree ρin, and the polarization degree correction unit 34 smooths the polarization degree using a Gaussian filter, for example to calculate the DC component ρdc. FIG. 10 exemplifies a filter coefficient of the Gaussian filter, and the central position corresponds to a pixel to be processed. The polarization degree correction unit 34 adds the multiplication results of the polarization degree and the filter coefficient, and multiplies the addition result by the sum of weights, thereby calculating the DC component ρdc of the polarization degree in the pixel to be processed.

The operation of the fourth embodiment is similar to that of the first embodiment illustrated in FIG. 9, and the processing of polarization degree correction of step ST5 is different. That is, the polarization degree correction unit 34 of the information processor 30 corrects the DC component obtained by smoothing the polarization degree calculated in step ST3 on the basis of the noise amount SNR calculated in step ST4, and adds the AC component to the corrected DC component to obtain a corrected polarization degree.

According to the fourth embodiment as described above, the polarization degree in which the influence of noise is corrected can be calculated and accurate normal line information can be generated in a similar manner to the first embodiment. Furthermore, in the fourth embodiment, the DC component obtained by smoothing the polarization degree calculated by the polarization degree calculation unit 32 is corrected according to the noise amount, whereby correction that is robust to variations in polarization degree can be performed.

6. Fifth Embodiment

Next, a fifth embodiment will be described. In the fifth embodiment, the influence of noise is corrected at the time of calculating a zenith angle using a polarization degree, and normal line information is generated using the corrected zenith angle.

Figure 11:
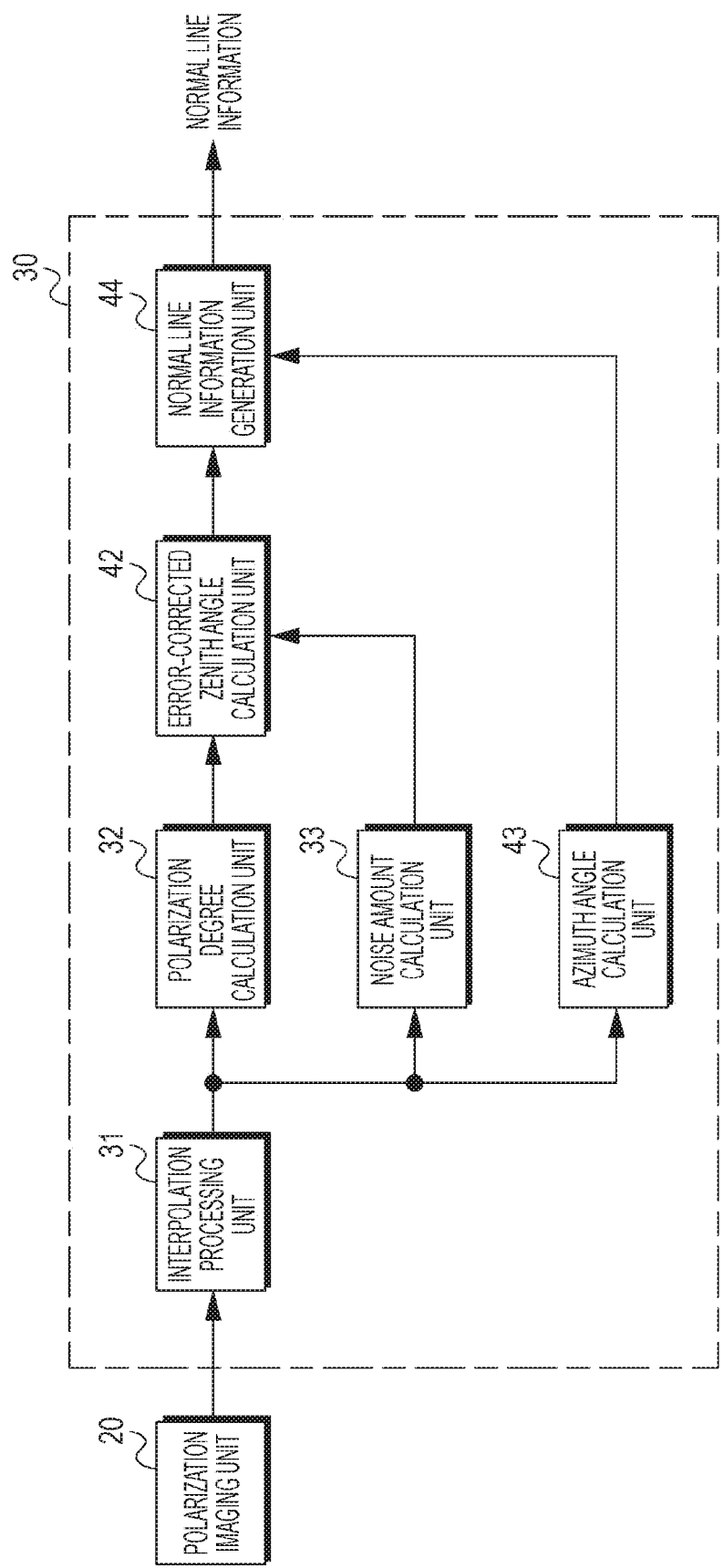
FIG. 11 is a diagram exemplifying a configuration of a fifth embodiment.

FIG. 11 exemplifies a configuration of the fifth embodiment. An information processor 30 includes an interpolation processing unit 31, a polarization degree calculation unit 32, a noise amount calculation unit 33, an error-corrected zenith angle calculation unit 42, an azimuth angle calculation unit 43, and a normal line information generation unit 44. Note that the error-corrected zenith angle calculation unit 42 corresponds to an information correction unit in the fifth embodiment and a sixth embodiment to be described later.

In a similar manner to the first embodiment, the interpolation processing unit 31 carries out interpolation processing using image signals of a polarization image that is generated by the polarization imaging unit 20 and includes pixels for each of a plurality of polarization components, and generates a polarization image for each polarization component. The interpolation processing unit 31 outputs the generated polarization image for each polarization component to the polarization degree calculation unit 32, the noise amount calculation unit 33, and the azimuth angle calculation unit 43.

In a similar manner to the first embodiment, the polarization degree calculation unit 32 calculates a polarization degree for each pixel on the basis of the polarization image for each polarization component, and outputs it to the error-corrected zenith angle calculation unit 42.

In a similar manner to the first embodiment, the noise amount calculation unit 33 calculates a noise amount for each pixel on the basis of the polarization image for each polarization component, and outputs it to the error-corrected zenith angle calculation unit 42.

The error-corrected zenith angle calculation unit 42 calculates a zenith angle whose error is corrected on the basis of the polarization degree calculated by the polarization degree calculation unit 32 and the noise amount calculated by the noise amount calculation unit 33. The error-corrected zenith angle calculation unit 42 has, as change characteristic information, a two-dimensional table TN [SNR] [θ] that shows a change in polarization degree according on the noise amount for each zenith angle. The error-corrected zenith angle calculation unit 42, the error-corrected zenith angle calculation unit 42 calculates, using the two-dimensional table TL [SNR] [θ], a zenith angle θout in which an error is corrected according to the polarization degree (ρin) calculated by the polarization degree calculation unit 32 and the noise amount SNR calculated by the noise amount calculation unit 33. The error-corrected zenith angle calculation unit 42 obtains, from the two-dimensional table TL [SNR] [θ], the polarization degree according to the noise amount SNR calculated by the noise amount calculation unit 33, and outputs, to the normal line information generation unit 44, the zenith angle corresponding to the polarization degree that minimizes the difference from the polarization degree ρin calculated by the polarization degree calculation unit 32 as the zenith angle θout in which the error is corrected. The formula (34) expresses a formula for calculating the zenith angle θout in which the error is corrected.

[Numeral 13]

$$\theta_{out} = \underset{\theta}{\arg\min}(|\rho - \text{tableNoise}[SNR][\theta]|) \quad (34)$$

In a similar manner to the first embodiment, the azimuth angle calculation unit 43 calculates an azimuth angle on the basis of a luminance value for each polarization direction, and outputs it to the normal line information generation unit 44. The normal line information generation unit 44 generates, in a similar manner to the first embodiment, normal line information indicating a three-dimensional vector (X, Y, Z) of a normal line using the zenith angle C calculated by the error-corrected zenith angle calculation unit 42 and the azimuth angle φ calculated by the azimuth angle calculation unit 43.

Figure 12:
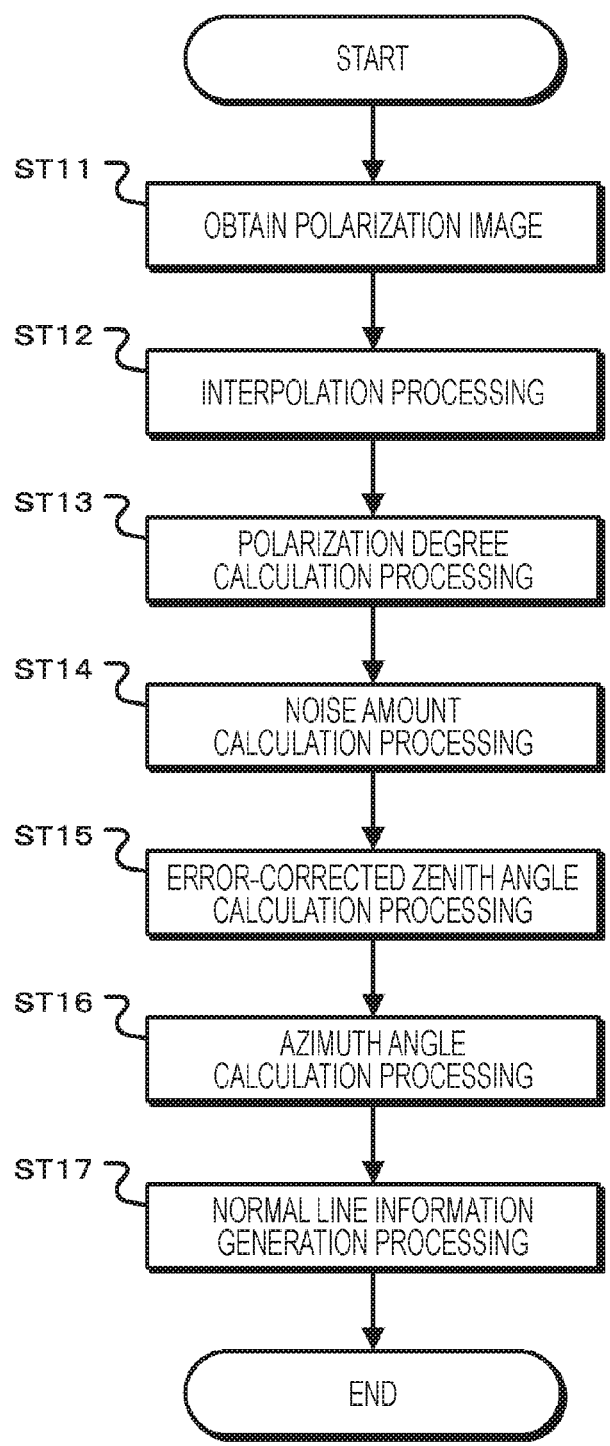
FIG. 12 is a flowchart exemplifying operation of the fifth embodiment.

Next, operation of the fifth embodiment will be described. FIG. 12 is a flowchart exemplifying the operation of the fifth embodiment. In step ST11, the information processor 30 obtains the polarization image generated by the polarization imaging unit 20, and the process proceeds to step ST12.

In step ST12, the information processor 30 performs interpolation processing. The interpolation processing unit 31 of the information processor 30 performs the interpolation processing using the polarization image obtained in step ST11, generates a polarization image for each polarization component from the polarization image including pixels for each of a plurality of polarization components, and the process proceeds to step ST13.

In step ST13, the information processor 30 performs processing of polarization degree calculation. The polarization degree calculation unit 32 of the information processor 30 performs the calculation of the formula (6) for each pixel using the polarization image for each polarization component, calculates a polarization degree ρ, and the process proceeds to step ST14.

In step ST14, the information processor 30 performs processing of noise amount calculation. The noise amount calculation unit 33 of the information processor 30 performs the calculation of the formula (8) for each pixel using the polarization image for each polarization component, calculates the noise amount SNR, and the process proceeds to step ST15.

In step ST15, the information processor 30 performs processing of error-corrected zenith angle calculation. The error-corrected zenith angle calculation unit 42 of the information processor 30 performs the calculation of the formula (34) using the two-dimensional table TL [SNR] [θ] stored in advance, the polarization degree calculated in step ST13, and the noise amount calculated in step ST14, calculates a zenith angle in which the error is corrected, and the process proceeds to step ST16.

In step ST16, the information processor 30 performs processing of azimuth angle calculation. The azimuth angle calculation unit 43 of the information processor 30 performs the calculation of the formula (21) using the polarization image for each polarization component assuming that the diffuse reflection is dominant, for example, and calculates the azimuth angle φ. Furthermore, in a case where the specular reflection is dominant obviously, the azimuth angle φ is calculated on the basis of the formula (22). The azimuth angle calculation unit 43 calculates the azimuth angle using the polarization image for each polarization component, and the process proceeds to step ST17.

In step ST17, the information processor 30 performs processing of normal line information generation. The normal line information generation unit 44 of the information processor 30 performs the calculation of the formulae (23) to (25) using the zenith angle θ calculated in step ST15 and the azimuth angle φ calculated in step ST16, and generates the normal line information indicating the three-dimensional vector (X, Y, Z) of the normal line.

Note that, in FIG. 12, either of steps ST13 and ST14 may be performed first, and the polarization degree and the noise amount may be calculated by parallel processing. Furthermore, the processing of azimuth angle calculation in step ST16 may be carried out at any timing as long as it is after the interpolation processing and before the processing of normal line information generation. Moreover, in a case where the polarization image to be obtained in step ST11 is an image for each polarization direction, it is not required to perform the interpolation processing of step ST12.

According to the fifth embodiment as described above, it becomes possible to calculate the zenith angle in which the influence of noise is corrected. Furthermore, by using the corrected zenith angle, the normal line information can be generated accurately.

7. Sixth Embodiment

Next, a sixth embodiment will be described. The sixth embodiment has a configuration that is more robust to variations in polarization degree than that in the fifth embodiment.

An information processor 30 according to the sixth embodiment has a configuration similar to that of the fifth embodiment, and operation of an error-corrected zenith angle calculation unit is different from that of the fifth embodiment.

An error-corrected zenith angle calculation unit 42 sets, on the basis of a direct current component (DC component) obtained by smoothing the polarization degree ρin calculated by a polarization degree calculation unit 32, a noise amount SNR calculated by a noise amount calculation unit 33, and a two-dimensional table TL [SNR] [θ], the zenith angle corresponding to the polarization degree that minimizes the difference from the DC component of the polarization degree ρin as a zenith angle θdc in which the error with respect to the DC component is corrected. Note that it is sufficient if the process of smoothing the polarization degree ρin and calculating the DC component are carried out in a similar manner to that of the fourth embodiment.

Furthermore, the error-corrected zenith angle calculation unit 42 adds the zenith angle corresponding to the alternating current component of the polarization degree calculated on the basis of the polarization image to the zenith angle in which the error with respect to the DC component is corrected, and outputs it to a normal line information generation unit 44 as a corrected zenith angle θout. The error-corrected zenith angle calculation unit 42 sets the difference between the zenith angle with respect to the polarization degree ρin and the zenith angle with respect to the DC component as a zenith angle of the alternating current component (AC component). The formula (35) expresses a formula for calculating the zenith angle in which the error is corrected. In the formula (35), $g_\theta$ (SNR, ρdc) represents a value when the polarization degree ρ in the formula (34) mentioned above is set to be the DC component ρdc of the polarization degree. Furthermore, $g_\theta$ (ρin) represents a value when the polarization degree ρ in the formula (13) or (18) is set to be the polarization degree ρin, $g_\theta$ (ρdc) represents a value when the polarization degree ρ in the formula (13) or (18) is set to be the DC component ρdc, and ($g_\theta$ (ρin)−$g_\theta$ (ρdc)) corresponds to the zenith angle corresponding to the AC component.

[Numeral 14]

$$\theta out = g_\theta(SNR, \rho_{dc}) + (g_\theta(\rho in) - g_\theta(\rho_{dc})) \quad (35)$$

The operation of the sixth embodiment is similar to that of the fifth embodiment illustrated in FIG. 12, and the processing of error-corrected zenith angle calculation of step ST15 is different. That is, the polarization degree correction unit 34 of the information processor 30 calculates the corrected zenith angle corresponding to the DC component of the polarization degree on the basis of the DC component obtained by smoothing the polarization degree calculated in step ST13, the noise amount SNR calculated in step ST14, and the two-dimensional table TL [SNR] [θ]. Furthermore, the error-corrected zenith angle calculation unit 42 adds the zenith angle of the AC component to the corrected zenith angle corresponding to the DC component of the polarization degree to calculate a zenith angle in which the error is corrected.

According to the sixth embodiment as described above, the zenith angle in which the influence of noise is corrected can be calculated and accurate normal line information can be generated in a similar manner to the fifth embodiment. Furthermore, in the sixth embodiment, the zenith angle is corrected according to the noise amount and the DC component obtained by smoothing the polarization degree calculated by the polarization degree calculation unit 32, whereby a zenith angle that is robust to variations in polarization degree can be calculated.

8. Seventh Embodiment

Next, a seventh embodiment will be described. In the seventh embodiment, a case where reflection component information is calculated as object surface information will be described.

Figure 13:
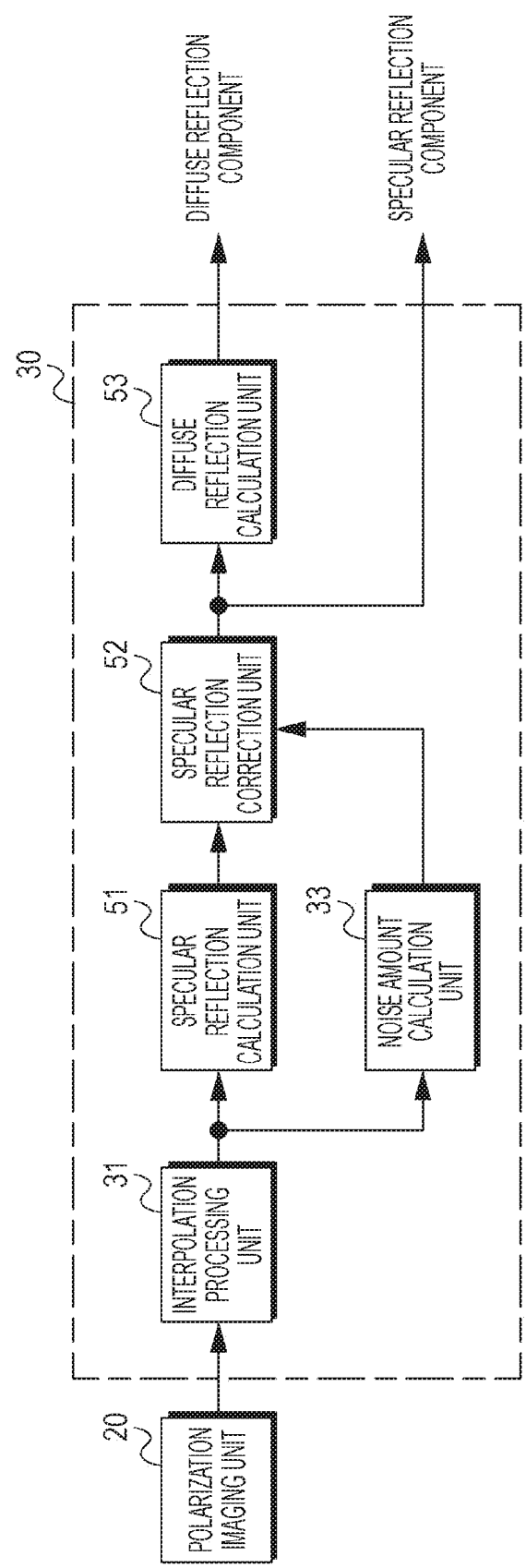
FIG. 13 is a diagram exemplifying a configuration of a seventh embodiment.

FIG. 13 exemplifies a configuration of the seventh embodiment. An information processor 30 includes an interpolation processing unit 31, a noise amount calculation unit 33, a specular reflection calculation unit 51, a specular reflection correction unit 52, and a diffuse reflection calculation unit 53. Note that the specular reflection correction unit 52 corresponds to an information correction unit in the seventh embodiment and eighth to ninth embodiments to be described later.

In a similar manner to the first embodiment, the interpolation processing unit 31 carries out interpolation processing using image signals of a polarization image that is generated by the polarization imaging unit 20 and includes pixels for each of a plurality of polarization components, and generates a polarization image for each polarization component. The interpolation processing unit 31 outputs the generated polarization image for each polarization component to the noise amount calculation unit 33 and the specular reflection calculation unit 51.

In a similar manner to the first embodiment, the noise amount calculation unit 33 performs the calculation of the formula (7) using the polarization image for each polarization component, calculates noise variance σ for each pixel, and outputs it to the specular reflection correction unit 52 as a noise amount.

The specular reflection calculation unit 51 calculates, on the basis of the polarization image for each polarization component, a specular reflection component s on the basis of the formula (36). Note that the parameters a and b in the formula (36) are calculated on the basis of the formula (5). The specular reflection calculation unit 51 outputs the calculated specular reflection component s to the specular reflection correction unit 52.

[Numeral 15]

$$s = \sqrt{a^2 + b^2} \quad (36)$$

The specular reflection correction unit 52 corrects the specular reflection component on the basis of the specular reflection component calculated by the specular reflection calculation unit 51 and the noise amount calculated by the noise amount calculation unit 33. The specular reflection correction unit 52 has, as change characteristic information, a look-up table LUT [σ] [s] that indicates, for each specular reflection component, the changed specular reflection component according to the noise amount for each noise amount. The specular reflection correction unit 52 outputs a corrected specular reflection component sout using the specular reflection component (sin) calculated by the specular reflection calculation unit 51, the noise amount σ calculated by the noise amount calculation unit 33, and the look-up table LUT [σ] [s].

The formula (37) expresses a generation formula of the look-up table LUT [σ] [s]. Furthermore, a variable λ in the formula (37) is a value calculated on the basis of the formula (38).

[Numeral 16]

$$LUT[\sigma][s] = \sqrt{\frac{\pi}{2}} e^{\frac{-\lambda^2}{4}} \left[ \left(1 + \frac{\lambda^2}{2}\right) I_0\left(\frac{\lambda^2}{4}\right) + \left(\frac{\lambda^2}{2}\right) I_1\left(\frac{\lambda^2}{4}\right) \right] \sigma \quad (37)$$

$$\lambda = \frac{s}{\sigma} \quad (38)$$

Figure 14:
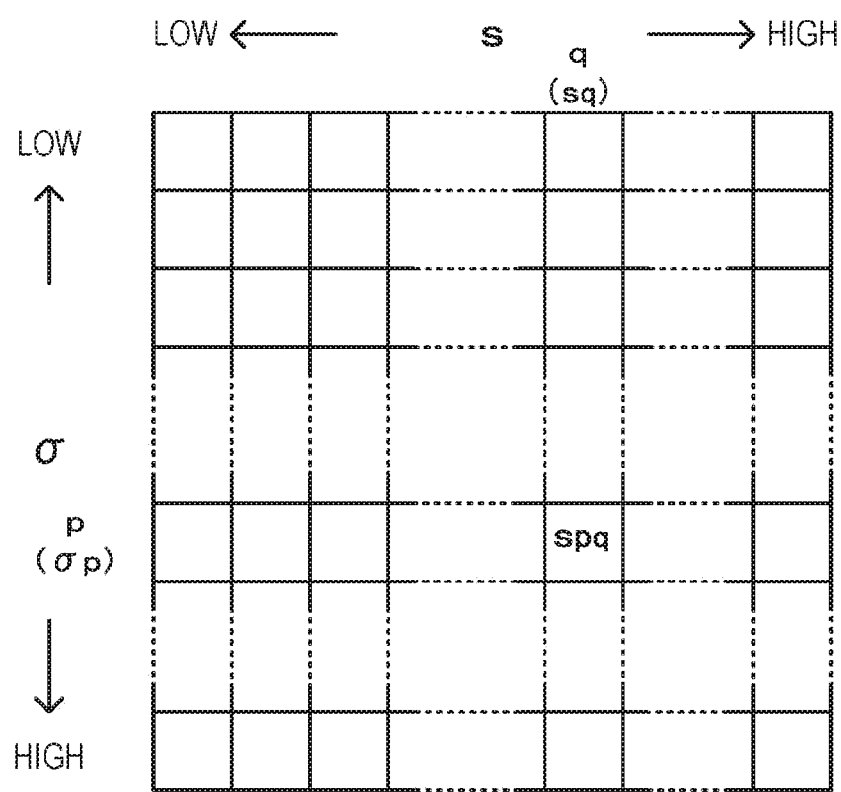
FIG. 14 is a diagram illustrating a look-up table LUT [σ] [s].

FIG. 14 illustrates the look-up table LUT [σ] [s]. The look-up table LUT [σ] [s] shows the specular reflection component s before a change in the row direction, and the noise amount σ in the column direction. Furthermore, the coordinate position specified by the specular reflection component s and the noise amount σ indicates a changed specular reflection component representing how the specular reflection component s changes at the time of the noise amount G.

The specular reflection correction unit 52 performs the calculation of the formula (39) using the specular reflection component sin calculated by the specular reflection calculation unit 51, the noise amount σ calculated by the noise amount calculation unit 33, and the look-up table LUT [σ] [s], and sets the specular reflection component before the change corresponding to the changed polarization degree that minimizes the difference from the calculated specular reflection component s at the calculated noise amount σ as a changed specular reflection component sout.

[Numeral 17]

$$s_{out} = \underset{s}{\mathrm{argmin}}(s_{in} - LUT[\sigma][s]) \quad (39)$$

For example, when the noise variance σ calculated by the noise amount calculation unit 33 is σp, the row of p in the look-up table is used. Furthermore, when the difference between the changed specular reflection component spq and the specular reflection component sin is minimized in the row of p, the specular reflection component sq in the q column of the changed specular reflection component spq is set as a corrected specular reflection component sout.

Figure 5:
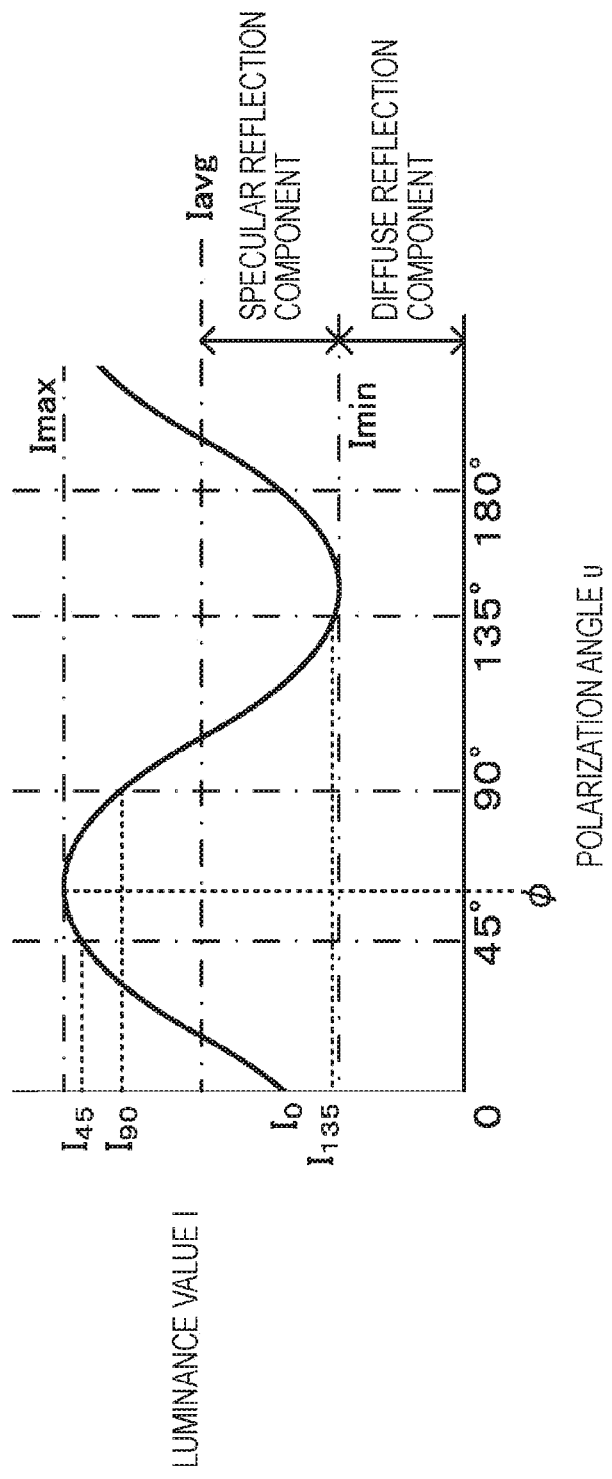
FIG. 5 is a graph exemplifying a relationship between luminance and a polarization angle.

The diffuse reflection calculation unit 53 calculates a diffuse reflection component on the basis of the polarization image for each polarization component generated by the interpolation processing unit 31 and the specular reflection component corrected by the specular reflection correction unit 52. As illustrated in FIG. 5, the specular reflection component s indicates the maximum luminance difference between the luminance average value of the polarization image for each polarization component and the luminance value having the cos waveform characteristic, and a value obtained by subtracting the specular reflection component s from the average luminance value Iavg corresponding to the parameter c is a diffuse reflection component d. Therefore, the diffuse reflection calculation unit 53 performs the calculation of the formula (40) for each pixel to calculate the diffuse reflection component d. Note that the parameter c in the formula (40) represents a value calculated on the basis of the formula (5).

$$d = c - s \quad (40)$$

Figure 15:
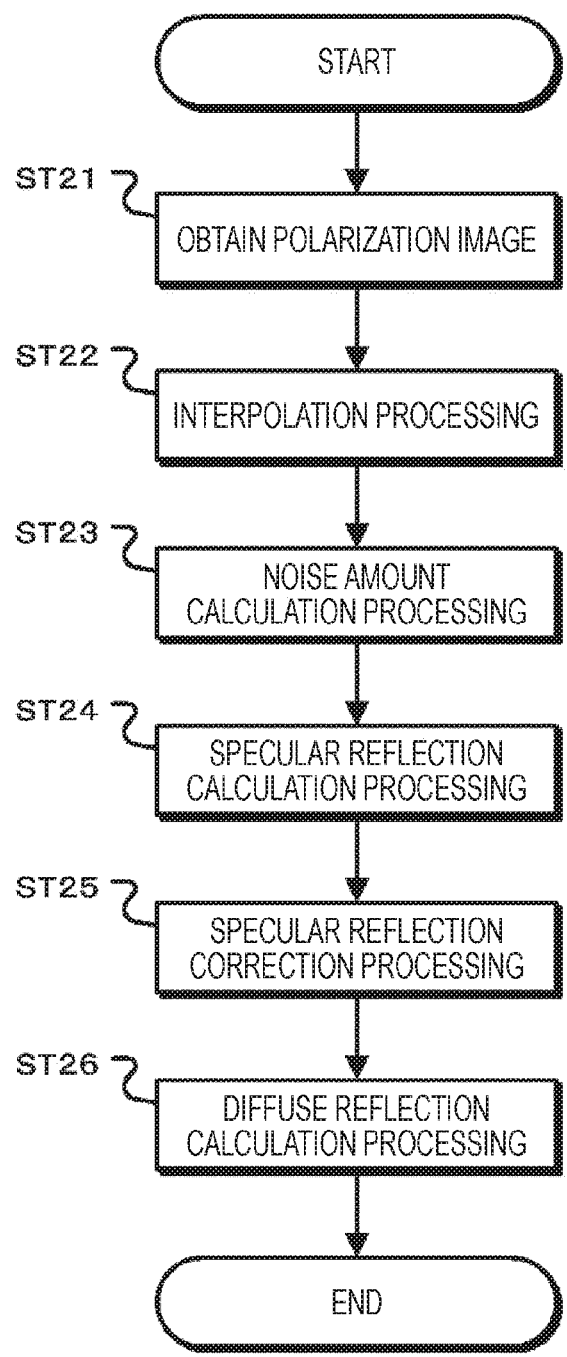
FIG. 15 is a flowchart exemplifying operation of the seventh embodiment.

Next, operation of the seventh embodiment will be described. FIG. 15 is a flowchart exemplifying the operation of the seventh embodiment. In step ST21, the information processor 30 obtains a polarization image. The information processor 30 obtains the polarization image generated by the polarization imaging unit 20, and the process proceeds to step ST22.

In step ST22, the information processor 30 performs interpolation processing. The interpolation processing unit 31 of the information processor 30 performs the interpolation processing using the polarization image obtained in step ST21, generates a polarization image for each polarization component from the polarization image including pixels for each of a plurality of polarization components, and the process proceeds to step ST23.

In step ST23, the information processor 30 performs processing of noise amount calculation. The noise amount calculation unit 33 of the information processor 30 performs the calculation of the formula (7) for each pixel using the polarization image for each polarization component, calculates the noise amount G, and the process proceeds to step ST24.

In step ST24, the information processor 30 performs processing of specular reflection calculation. The specular reflection calculation unit 51 of the information processor 30 performs the calculation of the formula (36) for each pixel using the polarization image for each polarization component, calculates a specular reflection component s, and the process proceeds to step ST25.

In step ST25, the information processor 30 performs processing of specular reflection correction. The specular reflection correction unit 52 of the information processor 30 uses the look-up table LUT [σ] [s] stored in advance to obtain a corrected specular reflection component on the basis of the noise variance calculated in step ST23 and the specular reflection component calculated in step ST24, and the process proceeds to step ST26.

In step ST26, the information processor 30 performs processing of diffuse reflection calculation. The zenith angle calculation unit 41 of the information processor 30 performs the calculation of the formula (40) for each pixel using the corrected polarization degree obtained in step ST5, and calculates a diffuse reflection component d.

Note that, in FIG. 15, either of steps ST23 and ST24 may be performed first, and the polarization degree and the noise amount may be calculated by parallel processing. Furthermore, in a case where the polarization image to be obtained in step ST21 is an image for each polarization direction, it is not required to perform the interpolation processing of step ST22.

As described above, according to the seventh embodiment, it becomes possible to calculate the specular reflection component in which the influence of noise is corrected. Furthermore, by using the corrected specular reflection component, the reflection component information can be generated accurately.

9. Eighth Embodiment

Next, an eighth embodiment will be described. The eighth embodiment has a configuration simpler than that of the seventh embodiment.

An information processor 30 according to the eighth embodiment has a configuration similar to that of the seventh embodiment, and operation of a specular reflection correction unit is different from that of the seventh embodiment. A specular reflection correction unit 52 uses a correction gain function as change characteristic information indicating a change in specular reflection component according to the noise amount. The specular reflection correction unit 52 calculates, on the basis of a correction gain function g (σ, sin), a correction gain according to a noise amount σ calculated by a noise amount calculation unit 33 and a specular reflection component (sin) calculated by a specular reflection calculation unit 51 on the basis of a polarization image, and corrects the specular reflection component sin using the calculated correction gain. The formula (41) expresses a correction formula of the specular reflection component. Furthermore, the formula (42) expresses the correction gain function g (σ, sin), and a variable t is a value calculated on the basis of the formula (43). Note that, in the formula (43), a parameter th0 indicates a value expressed by the formula (44), and a parameter th1 indicates a value calculated on the basis of the formula (45).

[Numeral 18]

$$s_{out} = g(\sigma, s_{in}) \cdot s_{in} \tag{41}$$

$$g(\sigma, s) = t^2(-2t+3) \tag{42}$$

$$t = \min\left(\max\left(\frac{s - th0}{th1 - th0}, 0\right), 1\right) \tag{43}$$

$$th0 = 0 \tag{44}$$

$$th1 = \frac{\sqrt{\pi}}{2}\sigma \tag{45}$$

The operation of the eighth embodiment is similar to that of the seventh embodiment illustrated in FIG. 15, and the processing of specular reflection correction of step ST25 is different. That is, the specular reflection correction unit 52 of the information processor 30 obtains a corrected specular reflection component using the noise amount calculated in step ST23, the specular reflection component calculated in step ST24, and the correction gain function g (σ, sin).

As described above, according to the eighth embodiment, the specular reflection component in which the influence of noise is corrected can be calculated and accurate reflection component information can be generated in a similar manner to the seventh embodiment.

It becomes possible to calculate a polarization degree in which the influence of noise is corrected, and to generate accurate normal line information. Furthermore, according to the eighth embodiment, it becomes possible to correct the specular reflection component using the correction gain function g (σ, sin), whereby the look-up table LUT [σ] [s] is not required to be stored as in the seventh embodiment, and a configuration can be made simpler than that of the seventh embodiment.

10. Ninth Embodiment

Next, a ninth embodiment will be described. The ninth embodiment has a configuration that is more robust to variations in polarization degree than that in the seventh embodiment.

An information processor 30 according to the ninth embodiment has a configuration similar to that of the seventh embodiment, and operation of a specular reflection correction unit is different from that of the seventh embodiment.

A specular reflection correction unit 52 corrects a direct current component (DC component) obtained by smoothing a specular reflection component sin calculated by a specular reflection calculation unit 51 according to a noise amount G. Moreover, the specular reflection correction unit 52 adds an alternating current component (AC component) of the specular reflection component to the corrected DC component to calculate a corrected specular reflection component sout. The formula (46) expresses a correction formula of the polarization degree. Note that g (σ, sdc) in the formula (46) represents a value in a case where "sdc" is used instead of "sin" in the formula (41).

[Numeral 19]

$$s_{out} = g(\sigma, s_{dc}) \cdot s_{dc} + (s_{in} - s_{dc}) \tag{46}$$

Any method may be used to calculate the DC component sdc of specular reflection, and the specular reflection correction unit 52 smooths the specular reflection using a filter in a similar manner to the fourth embodiment, for example, and calculates the DC component sdc.

The operation of the ninth embodiment is similar to that of the seventh embodiment illustrated in FIG. 15, and the processing of specular reflection correction of step ST25 is different. That is, the specular reflection correction unit 52 of the information processor 30 obtains a corrected DC component using the DC component obtained by smoothing the specular reflection calculated in step ST24, the noise amount calculated in step ST23, and the correction gain function g (σ, sin). Moreover, the specular reflection correction unit 52 adds the AC component of the specular reflection to the corrected DC component to obtain a corrected polarization degree.

According to the ninth embodiment as described above, in a similar manner to the seventh embodiment, it becomes possible to calculate the specular reflection component in which the influence of noise is corrected. Furthermore, by using the corrected specular reflection component, the reflection component information can be generated accurately. Moreover, in the ninth embodiment, the DC component obtained by smoothing the specular reflection calculated by the polarization degree calculation unit 32 is corrected according to the noise amount, whereby correction that is robust to variations in specular reflection can be performed.

11. Other Embodiments

Although a case where the polarization imaging unit 20 is provided with polarization pixels of four polarization directions has been exemplified in the embodiments described above, the polarization imaging unit 20 can calculate parameters a, b, and c as long as it has a configuration of including polarization pixels of three polarization directions (including non-polarization in the polarization direction). Furthermore, in a case where the polarization direction includes non-polarization, a non-polarization pixel indicates the average value of polarization pixels, and if polarization directions of two polarization pixels have a phase difference different from 90 degrees (e.g., in a case where the polarization directions are 0 degrees and 45 degrees), a luminance value of another polarization pixel (e.g., pixels having polarization directions of 90 degrees and 135 degrees) can be calculated.

The polarization imaging unit 20 and the information processor 30 may be provided integrally or separately. It is not limited to the case where the information processor 30 carries out the above-described process online using the polarization image obtained by the polarization imaging unit 20 to calculate object surface information, and the object surface information may be calculated through the above-described process carried out offline using a polarization image recorded in a recording medium or the like. Moreover, the polarization imaging unit 20 may include a color mosaic filter provided on the imaging surface of the image sensor to generate a color polarization image.

12. Application Example

The technology according to the present disclosure can be applied to various fields. For example, the technology according to the present disclosure may be implemented as a device to be mounted on any type of mobile body such as a vehicle, electric vehicle, hybrid electric vehicle, motorcycle, bicycle, personal mobility, airplane, drone, ship, and robot. Furthermore, it may be implemented as a device to be mounted on equipment used in a production process in a factory or equipment used in the construction field. When applied to such fields, the influence of noise included in a polarization image can be reduced, whereby generation of normal line information, separation of reflection components, and the like can be performed accurately on the basis of corrected object surface information. Therefore, the surrounding environment can be grasped accurately in three dimensions, and fatigue of a driver or a worker can be alleviated. Furthermore, autonomous driving and the like can be carried out more safely.

The technology according to the present disclosure can also be applied to the medical field. For example, if it is applied to the case of using a captured image of an operative site at the time of performing surgery, it becomes possible to accurately obtain a three-dimensional shape of the operative site or an image without reflection, whereby fatigue of an operator can be alleviated and the surgery can be performed safely and more reliably.

Furthermore, the technology according to the present disclosure can also be applied to fields such as public services. For example, when an image of a subject is published in a book, a magazine, and the like, it becomes possible to accurately remove unnecessary reflection components and the like from the image of the subject.

The series of processes described herein can be executed by hardware, software, or a combination of both of them. In a case where the processes are executed by software, a program in which a processing sequence is recorded is installed in a memory in a computer built in dedicated hardware, and is executed. Alternatively, the program can be installed in a general-purpose computer capable of executing various kinds of processing and executed.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (BD (registered trademark)), a magnetic disk, and a semiconductor memory card. Such a removable recording medium can be provided as what is called package software.

Furthermore, the program may be installed in a computer from a removable recording medium, or may be transferred from a download site to a computer by wire or wirelessly via a network such as a local area network (LAN) and the Internet. A computer can receive the program transferred in such a manner and install it in a recording medium such as a built-in hard disk.

Note that the effects described herein are merely examples and are not limited, and there may be additional effects not described herein. Furthermore, the present technology should not be construed as being limited to the embodiments of the technology described above. The embodiments of the present technology disclose the present technology in a form of illustration, and it is obvious that those skilled in the art can modify or substitute the embodiments without departing from the gist of the present technology. That is, in order to determine the gist of the present technology, the scope of claims should be taken into consideration.

Furthermore, the information processing apparatus according to the present technology can also have the following configurations.

(1) An information processing apparatus including:
  an information correction unit that corrects object surface information calculated on the basis of polarization information according to a noise amount of the polarization information.

(2) The information processing apparatus according to (1), in which the information correction unit corrects the object surface information according to the noise amount of the polarization information on the basis of change characteristic information indicating a change in the object surface information according to the noise amount.

(3) The information processing apparatus according to (2), in which the object surface information includes a polarization degree, a zenith angle, or a reflection component.

(4) The information processing apparatus according to (3), in which the object surface information includes a polarization degree or a specular reflection component, and
  the information correction unit has, as the change characteristic information, a table showing, for each polarization degree, changed object surface information according to a noise amount for each noise amount, and sets the object surface information before the change corresponding to the changed object surface information that minimizes a difference from the object surface information calculated on the basis of the polarization information at the noise amount of the polarization information as the object surface information after correction.

(5) The information processing apparatus according to (3), in which the object surface information includes a zenith angle, and
the information correction unit has, as the change characteristic information, a table showing a change in a polarization degree according to a noise amount for each zenith angle, and sets a zenith angle corresponding to the polarization degree according to the noise amount of the polarization information that minimizes a difference from the polarization degree calculated on the basis of the polarization information as a corrected zenith angle.

(6) The information processing apparatus according to (3), in which the information correction unit corrects the object surface information using the noise amount of the polarization information and a correction gain set on the basis of the object surface information calculated on the basis of the polarization information.

(7) The information processing apparatus according to (6), in which the noise amount of the polarization information is a ratio of an average luminance value of the polarization information to noise variance.

(8) The information processing apparatus according to (3), in which the object surface information includes a polarization degree or a specular reflection component, and
the information correction unit corrects, according to the noise amount of the polarization information, a direct current component obtained by smoothing the object surface information calculated on the basis of the polarization information.

(9) The information processing apparatus according to (8), in which the information correction unit uses a difference between the object surface information calculated on the basis of the polarization information and the direct current component as an alternating current component of the object surface information, and sets an addition result of the alternating current component and the direct current component corrected according to the noise amount as the object surface information after correction.

(10) The information processing apparatus according to (3), in which the object surface information includes a zenith angle, and
the information correction unit sets a zenith angle for the polarization degree that minimizes a difference from a direct current component obtained by smoothing the polarization degree calculated on the basis of the polarization information as a zenith angle for the direct current component after correction.

(11) The information processing apparatus according to (10), in which the information correction unit adds a zenith angle according to an alternating current component of the polarization degree calculated on the basis of the polarization information to the corrected zenith angle for the direct current component to obtain a corrected zenith angle.

(12) The information processing apparatus according to any one of (1) to (11), in which noise variance generated in a polarization imaging unit that has obtained the polarization information is used as the noise amount of the polarization information.

(13) The information processing apparatus according to any one of (1) to (12), in which the information correction unit corrects the object surface information calculated for each pixel of a polarization image based on the polarization information according to a noise amount calculated for each pixel of the polarization image.

(14) The information processing apparatus according to any one of (1) to (13), further including a polarization imaging unit that obtains the polarization information.

(15) The information processing apparatus according to any one of (1) to (14), further including a normal line information generation unit that generates normal line information on the basis of the object surface information corrected by the information correction unit.

(16) The information processing apparatus according to any one of (1) to (15), further including a diffuse reflection calculation unit that calculates a non-polarization component from the polarization information, and subtracts a specular reflection component corrected by the information correction unit from the non-polarization component to calculate a diffuse reflection component.

INDUSTRIAL APPLICABILITY

According to the information processing apparatus, the method for processing information, and the program of the present technology, a noise amount of polarization information is calculated, and object surface information calculated on the basis of the polarization information is corrected according to the calculated noise amount. Accordingly, the object surface information that is robust to noise can be obtained. Therefore, it is suitable for a device that performs subject recognition, reflection component adjustment, and the like.

REFERENCE SIGNS LIST

10 Information acquisition system
20 Polarization imaging unit
30 Information processor
31 Interpolation processing unit
32 Polarization degree calculation unit
33 Noise amount calculation unit
34 Polarization degree correction unit
41 Zenith angle calculation unit
42 Error-corrected zenith angle calculation unit
43 Azimuth angle calculation unit
44 Normal line information generation unit
51 Specular reflection calculation unit
52 Specular reflection correction unit
53 Diffuse reflection calculation unit
201 Image sensor
202 Polarizing filter
203 Lens
204, 211, 2121-1 to 212-4 Polarizer
210, 210-1 to 210-4 Imaging unit

The invention claimed is:
1. An information processing apparatus, comprising:
a central processing unit (CPU) configured to:
calculate object surface information based on polarization information, wherein
the object surface information includes a polarization degree, a first zenith angle, or a reflection component;

correct the object surface information based on change characteristic information, wherein
the change characteristic information indicates a change in the object surface information based on a noise amount of the polarization information, and
the change characteristic information corresponds to a table that indicates, for each polarization degree, changed object surface information based on a noise amount for each noise amount;
set the object surface information before the change corresponding to the changed object surface information as the object surface information after correction, wherein the changed object surface information minimizes a difference from the object surface information at the noise amount of the polarization information.

2. The information processing apparatus according to claim 1, wherein the CPU is further configured to:
set a correction gain based on the object surface information; and
correct the object surface information using the noise amount of the polarization information and the set correction gain.

3. The information processing apparatus according to claim 2, wherein the noise amount of the polarization information is a ratio of an average luminance value of the polarization information to noise variance.

4. The information processing apparatus according to claim 1, wherein
the object surface information further includes a specular reflection component, and
the CPU is further configured to:
obtain a direct current component based on smoothing the object surface information,
correct, based on the noise amount of the polarization information, the obtained direct current component.

5. The information processing apparatus according to claim 4, wherein the CPU is further configured to:
use a difference between the object surface information and the direct current component as an alternating current component of the object surface information, and
set an addition result of the alternating current component and the direct current component corrected based on the noise amount as the object surface information after correction.

6. The information processing apparatus according to claim 1, wherein
the CPU is further configured to:
calculate a direct current component based on smoothing the polarization degree,
set a second zenith angle for the polarization degree that minimizes a difference from the direct current component based on the polarization information as a third zenith angle for the direct current component after correction.

7. The information processing apparatus according to claim 6, wherein
the CPU is further configured to:
calculate an alternating current component of the polarization degree based on the polarization information;
add a fourth zenith angle based on the alternating current component of the polarization degree to the third zenith angle for the direct current component to obtain a corrected zenith angle.

8. The information processing apparatus according to claim 1, further comprising an image sensor configured to obtain the polarization information, wherein
noise variance generated in the plurality of polarization pixels is used as the noise amount of the polarization information.

9. The information processing apparatus according to claim 1, wherein the CPU is further configured to:
calculate a noise amount for each pixel of a polarization image; and
correct, the object surface information calculated for each pixel of a polarization image based on the polarization information, based on the noise amount calculated.

10. The information processing apparatus according to claim 1, wherein the CPU is further configured to generate normal line information based on the object surface information corrected.

11. The information processing apparatus according to claim 1, wherein the CPU is further configured to:
calculate a non-polarization component from the polarization information, and
subtract a specular reflection component corrected from the non-polarization component to calculate a diffuse reflection component.

12. A method for processing information, comprising:
calculating, by a central processing unit (CPU), object surface information based on polarization information, wherein
the object surface information includes a polarization degree, a zenith angle, or a reflection component; and
correcting, by the CPU, the object surface information based on change characteristic information, wherein
the change characteristic information indicates a change in the object surface information based on a noise amount of the polarization information, and
the change characteristic information corresponds to a table that indicates, for each polarization degree, changed object surface information based on a noise amount for each noise amount; and
setting the object surface information before the change corresponding to the changed object surface information as the object surface information after correction, wherein the changed object surface information minimizes a difference from the object surface information at the noise amount of the polarization information.

13. A non-transitory computer-readable medium having stored thereon computer-executable instructions that, when executed by a central processing unit (CPU), cause the CPU to execute operations, the operations comprising:
calculating object surface information based on polarization information, wherein
the object surface information includes a polarization degree, a first zenith angle, or a reflection component;
correcting the object surface information based on change characteristic information, wherein
the change characteristic information indicates a change in the object surface information based on a noise amount of the polarization information, and
the change characteristic information corresponds to a table that indicates, for each polarization degree, changed object surface information based on a noise amount for each noise amount; and
setting the object surface information before the change corresponding to the changed object surface information as the object surface information after correction, wherein the changed object surface information minimizes a difference from the object surface information at the noise amount of the polarization information.

14. An information processing apparatus, comprising:
a central processing unit (CPU) configured to:
  calculate object surface information based on polarization information wherein
    the object surface information includes a polarization degree, a first zenith angle, or a reflection component; and
  correct the object surface information based on change characteristic information, wherein
    the change characteristic information indicates a change in the object surface information based on a noise amount of the polarization information;
    the change characteristic information is a table showing a change in a polarization degree based on a noise amount for each zenith angle, and calculate a polarization degree based on the polarization information; and
  set a second zenith angle corresponding to the polarization degree based on the noise amount of the polarization information as a corrected zenith angle, wherein the polarization degree based on the noise amount of the polarization information minimize a difference from the polarization degree calculated based on the polarization information.

* * * * *